(12) United States Patent
Liu

(10) Patent No.: US 8,881,631 B2
(45) Date of Patent: Nov. 11, 2014

(54) GLIDE MOVEMENT CONTROLLER AND POWER MITER SAW INCLUDING SUCH CONTROLLER

(71) Applicants: Robert Bosch Tool Corporation, Broadview, IL (US); Robert Bosch GmbH, Stuttgart (DE)

(72) Inventor: Jie Liu, Lisle, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/159,908

(22) Filed: Jan. 21, 2014

(65) Prior Publication Data

US 2014/0133900 A1    May 15, 2014

Related U.S. Application Data

(62) Division of application No. 13/194,670, filed on Jul. 29, 2011, now Pat. No. 8,631,734.

(51) Int. Cl.
    *E05D 7/00*    (2006.01)
(52) U.S. Cl.
    USPC .............................. 83/471.3; 16/2.1; 403/332
(58) Field of Classification Search
    USPC ............. 83/471.1, 483, 490, 471, 485, 471.3; 16/255, 252, 232, 253, 2.1; 403/332, 403/410
    See application file for complete search history.

(56) References Cited

U.S. PATENT DOCUMENTS

| 1,348,598 | A | * | 8/1920 | Stretch ............................. 296/92 |
| 1,417,669 | A | | 5/1922 | Langworthy |
| 1,620,701 | A | * | 3/1927 | Teich ............................. 16/339 |
| 1,707,764 | A | | 4/1929 | Mattison |
| 1,763,244 | A | | 6/1930 | Mattison |
| 1,765,733 | A | | 6/1930 | Olsen |
| 2,007,563 | A | | 7/1935 | Koning |
| 2,028,085 | A | | 1/1936 | Brunt |

(Continued)

FOREIGN PATENT DOCUMENTS

| AU | 640250 B2 | 2/1993 |
| DE | 197 10 865 A1 | 9/1998 |

(Continued)

OTHER PUBLICATIONS

International Search Report and Written Opinion in corresponding PCT application (i.e., PCT/US2012/048634), mailed Nov. 6, 2012 (11 pages).

(Continued)

*Primary Examiner* — Sean Michalski
(74) *Attorney, Agent, or Firm* — Maginot Moore & Beck LLP

(57) ABSTRACT

A glide movement controller for use with a hinge connection that includes a shaft, as well as a hinge connection and a power saw including such a controller. The glide movement controller includes a generally U-shaped controller body configured to move towards the shaft in a first direction such that resistance upon the shaft is increased and away from the shaft in a second direction such that resistance upon the shaft is decreased; a pair of apertures extending through the controller body; and an interior bearing surface defined on the controller body. The interior bearing surface is configured and arranged to face the shaft. In certain embodiments, at least a portion of the interior bearing surface is located between the apertures.

6 Claims, 21 Drawing Sheets

(56) References Cited

U.S. PATENT DOCUMENTS

| | | | |
|---|---|---|---|
| 2,051,428 A * | 8/1936 | Tatlow | 16/273 |
| 2,167,910 A | 8/1939 | Rottenburg | |
| 2,320,743 A | 6/1943 | Nilsen | |
| 2,389,296 A | 11/1945 | Crane | |
| 2,413,772 A | 1/1947 | Morehouse | |
| 2,569,354 A | 9/1951 | Tracy | |
| 2,579,862 A | 12/1951 | Richardson | |
| 2,607,949 A * | 8/1952 | Lyon | 16/340 |
| 2,652,862 A | 9/1953 | Henry | |
| 2,664,924 A | 1/1954 | Tracy | |
| 2,708,952 A | 5/1955 | Blackwell | |
| 2,766,077 A * | 10/1956 | Walstad | 384/191.3 |
| 2,773,524 A | 12/1956 | Schutz et al. | |
| 3,063,063 A | 11/1962 | Brooks | |
| 3,068,445 A | 12/1962 | Crowther | |
| 3,193,674 A | 7/1965 | Fleming | |
| 3,333,612 A | 8/1967 | Carr | |
| 3,563,131 A | 2/1971 | Ridley, Sr. | |
| 3,620,270 A | 11/1971 | Jureit et al. | |
| 4,011,782 A | 3/1977 | Clark et al. | |
| 4,507,042 A | 3/1985 | Suzuki et al. | |
| 4,529,352 A | 7/1985 | Suzuki et al. | |
| 4,587,875 A | 5/1986 | Deley | |
| 4,614,140 A | 9/1986 | Macksoud | |
| 4,674,445 A | 6/1987 | Cannelongo | |
| 4,705,243 A | 11/1987 | Hartmann | |
| 4,767,257 A | 8/1988 | Kato | |
| 4,836,044 A | 6/1989 | Lobig | |
| 4,862,781 A | 9/1989 | Lauffer | |
| 4,870,882 A | 10/1989 | Faxon, Sr. | |
| 4,892,022 A | 1/1990 | Cotton et al. | |
| 4,901,608 A | 2/1990 | Shieh | |
| 5,179,886 A | 1/1993 | Rathje, Jr. | |
| 5,203,245 A | 4/1993 | Terpstra | |
| 5,257,570 A | 11/1993 | Shiotani et al. | |
| 5,265,510 A | 11/1993 | Hoyer-Ellefsen | |
| 5,301,907 A | 4/1994 | Julian | |
| 5,316,245 A | 5/1994 | Ruckwardt | |
| 5,331,875 A | 7/1994 | Mayfield | |
| 5,355,111 A | 10/1994 | Haasler et al. | |
| 5,365,812 A | 11/1994 | Harnden | |
| 5,377,940 A | 1/1995 | Cabe et al. | |
| 5,437,207 A | 8/1995 | Zimmer | |
| 5,438,899 A | 8/1995 | Hoyer-Ellefsen | |
| 5,464,168 A | 11/1995 | Baker et al. | |
| 5,564,312 A | 10/1996 | Brunman et al. | |
| 5,638,731 A | 6/1997 | Garuglieri | |
| 5,639,049 A | 6/1997 | Jennings et al. | |
| D391,585 S | 3/1998 | Chen | |
| D391,973 S | 3/1998 | Price et al. | |
| 5,765,263 A * | 6/1998 | Bolinas et al. | 16/342 |
| 5,791,224 A | 8/1998 | Suzuki et al. | |
| 5,797,697 A | 8/1998 | Keller | |
| 5,839,339 A | 11/1998 | Sasaki et al. | |
| 5,870,939 A | 2/1999 | Matsubara | |
| 6,009,782 A | 1/2000 | Tajima et al. | |
| 6,035,491 A * | 3/2000 | Hartigan et al. | 16/342 |
| D425,083 S | 5/2000 | Brickner, Jr. et al. | |
| 6,099,191 A | 8/2000 | Werner | |
| 6,105,809 A * | 8/2000 | Yamanaka | 220/326 |
| 6,120,403 A | 9/2000 | Suzuki et al. | |
| 6,131,557 A | 10/2000 | Watson | |
| 6,293,504 B1 | 9/2001 | Hartmann | |
| 6,311,424 B1 | 11/2001 | Burke | |
| D455,445 S | 4/2002 | Bean et al. | |
| D459,373 S | 6/2002 | Hollinger et al. | |
| 6,398,170 B1 | 6/2002 | Wada | |
| 6,431,018 B1 | 8/2002 | Okada et al. | |
| 6,532,853 B1 | 3/2003 | Kakimoto et al. | |
| 6,591,451 B2 | 7/2003 | Gruber et al. | |
| 6,679,144 B2 | 1/2004 | Yeo et al. | |
| D487,280 S | 3/2004 | Hon et al. | |
| 6,732,982 B1 | 5/2004 | Messinger | |
| 6,732,983 B1 | 5/2004 | Blake | |
| 6,881,902 B2 | 4/2005 | Aoki et al. | |
| 6,889,939 B2 | 5/2005 | Rouyre et al. | |
| 6,892,618 B2 | 5/2005 | Chin-Chin | |
| 7,059,228 B2 | 6/2006 | Chang | |
| 7,387,056 B2 * | 6/2008 | Higuchi | 83/483 |
| 7,503,246 B2 | 3/2009 | Imamura et al. | |
| D664,572 S | 7/2012 | Zhou et al. | |
| 8,499,672 B2 | 8/2013 | Oberheim | |
| 8,631,734 B2 | 1/2014 | Liu | |
| 8,683,654 B2 * | 4/2014 | Chen | 16/301 |
| 2001/0045420 A1 | 11/2001 | Bong et al. | |
| 2002/0066346 A1 | 6/2002 | Gass et al. | |
| 2002/0090255 A1 | 7/2002 | Chien | |
| 2003/0226436 A1 | 12/2003 | Higuchi | |
| 2004/0069109 A1 | 4/2004 | Sprague | |
| 2004/0112190 A1 | 6/2004 | Hollis et al. | |
| 2005/0028660 A1 | 2/2005 | Chin-Chin | |
| 2005/0056128 A1 | 3/2005 | Chang | |
| 2006/0042444 A1 * | 3/2006 | Ushiwata et al. | 83/581 |
| 2007/0137452 A1 | 6/2007 | Oberheim | |
| 2007/0151434 A1 | 7/2007 | Oberheim | |
| 2010/0058909 A1 | 3/2010 | Chen | |
| 2010/0212467 A1 | 8/2010 | Oohama | |
| 2011/0303065 A1 | 12/2011 | Liu et al. | |
| 2012/0017737 A1 | 1/2012 | Liu et al. | |
| 2012/0237289 A1 * | 9/2012 | Guerin | 403/332 |

FOREIGN PATENT DOCUMENTS

| | | |
|---|---|---|
| DE | 20 2008 016 712 U1 | 6/2010 |
| EP | 1 410 886 A2 | 4/2004 |
| EP | 2 233 235 A2 | 9/2010 |

OTHER PUBLICATIONS

International Search Report and Written Opinion in corresponding PCT application (i.e., PCT/US2012/048615), mailed Oct. 25, 2012 (8 pages).

International Search Report and Written Opinion in corresponding PCT application (i.e., PCT/US2012/048628), mailed Nov. 9, 2012 (9 pages).

International Search Report and Written Opinion in corresponding PCT application (i.e., PCT/US2012/048624), mailed Oct. 26, 2012 (11 pages).

Machine Translation for DE 202008016712 (6 pages).

* cited by examiner

US 8,881,631 B2

GLIDE MOVEMENT CONTROLLER AND POWER MITER SAW INCLUDING SUCH CONTROLLER

This application is a divisional application of co-pending application Ser. No. 13/194,670, filed on Jul. 29, 2011 (now U.S. Pat. No. 8,631,734), the disclosure of which his hereby totally incorporated by reference in its entirety.

BACKGROUND OF THE INVENTION

This patent generally relates to a glide movement controller for use with power tools such as power miter and abrasive cut off saws, and to saws including such a controller.

Miter saws have been the subject of continued research and development efforts in the power tool arena for decades, and many improvements have been made that has resulted in increased ease of use and productivity. Artisans who install trim carpentry have used power miter saws for some time and it is well known that wide stock such as crown molding and the like often requires a miter saw with either a bigger saw blade or a configuration that enables the blade to be moved along a horizontal path away and toward the fence of the miter saw. Such blade moving configurations are generally marketed as sliding compound miter saws, principally because most if not all commercially available saws of this type have a sliding guide assembly comprised of elongated rods that slide in respective bushings to move the saw blade and motor assembly relative to the fence of the saw.

Such sliding guide assemblies are an expensive component of such miter saws. The current state of the art for such sliding miter saws includes a linear guide that typically consists of two of such bushings and rod combinations. These relatively expensive linear bearings consist of recirculating ball bearings that operate together with turned, ground, polished and hardened steel rods that are approximately 40 cm long and 30 mm in diameter. To have minimum play and deflection of the saw blade and motor assembly, precise fits are required between the rods and the linear recirculating ball bearings over the entire linear travel of the rods. The rod must be made of a high hardness steel to prevent indentation by the hard steel balls. Such construction is relatively expensive.

Additionally, an undesirable feature of such bushing and rod linear guides is that space must be provided behind the saw for the rods to extend when the saw blade is positioned near the fence. Because of this space requirement, such a sliding saw cannot be put next to a wall which results in a larger footprint being occupied by such a saw. Additionally, these bushings and rod linear guide mechanisms are susceptible to damage from dirt and grit, particularly if the saw is a sliding abrasive cut off saw where an abrasive wheel is used to cut steel and other materials. The abrasive wheel grinds its way through the steel and produces a considerable volume of abrasive particles that generally come out of the back of the saw. These abrasive particles can penetrate into the ball bushings and damage the bearing. While it is possible to cover the rods with a bellows or similar cover, the hostile environment generally leads to degradation of the fabric and penetration of the ball bushing by the abrasive particles.

There is a continuing need for improvement in the design and development of miter and cut-off saws that have linear guide assemblies.

SUMMARY OF THE INVENTION

A power miter saw including a saw base having a fence for positioning a work piece, a table rotatably connected to the saw base; a miter arm assembly for angularly positioning the table relative to the saw base, a saw blade and motor assembly operatively connected to the table, a linear guide mechanism attached to the table and being configured to support the saw blade and motor assembly and enable movement of the assembly along a predetermined linear path in either forward or rearward directions, the mechanism having a horizontal shaft about which the assembly is pivotable to move a saw blade vertically into and out of cutting position, the mechanism also having a multiple link hinge pivotally interconnecting the motor assembly and the table with generally horizontal shafts that are parallel to one another.

Also, A glide movement controller for use with a hinge connection that includes a shaft, as well as a hinge connection and a power saw including such a controller. The glide movement controller includes a generally U-shaped controller body configured to move towards the shaft in a first direction such that resistance upon the shaft is increased and away from the shaft in a second direction such that resistance upon the shaft is decreased; a pair of apertures extending through the controller body; and an interior bearing surface defined on the controller body. The interior bearing surface is configured and arranged to face the shaft. In certain embodiments, at least a portion of the interior bearing surface is located between the apertures.

DETAILED DESCRIPTION

Figure 1:
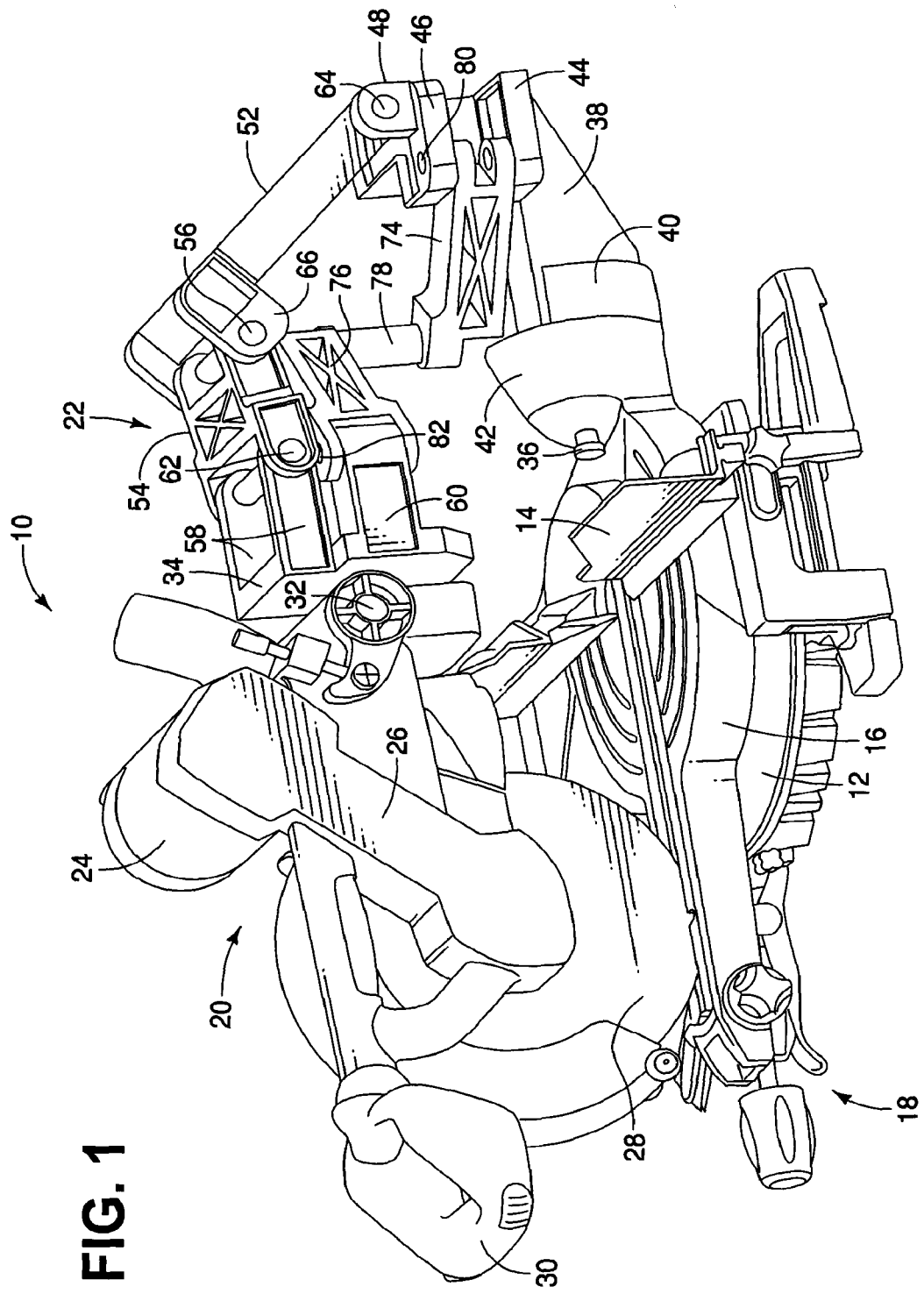
FIG. 1 is a right side perspective view of a first preferred embodiment of the present invention, particularly illustrating the saw blade being located in the extended position away from the fence.

Various different embodiments of the glide movement controller and miter saws are shown and described herein, with each of the embodiments of the miter saws having a multiple hinge linkage that is designated herein as a horizontal hinge linkage that interconnects the saw blade and motor assembly to the table of the miter saw. It should be understood that while it is referred to herein as a generally horizontal hinge linkage, the several shafts of the linkage may not always be exactly horizontal, and may have a pivot axis that can vary up to about 30 degrees in either direction from exact horizontal. However, it is preferred that the axes be in a substantially horizontal orientation when the saw is set at a zero degree bevel position. Regardless of the bevel angle or the orientation of the surface on which the saw is supported, the shafts are preferably substantially parallel to the arbor shaft in which the blade is mounted and therefore substantially perpendicular to the plane of the saw blade.

The horizontal hinge linkage is utilized rather than an elongated rod and bushing configuration and provides increased stiffness to undesired movement of the saw blade arising from structural deflections during cutting operations. Some of the embodiments also have a vertical hinge linkage for maintaining the elevation of the saw pivot head (to which the saw blade and motor assembly is attached) constant during movement of the saw blade and motor assembly away and toward the fence during a cutting operation. A third preferred embodiment utilizes the horizontal hinge linkage together with a single rod and bushing arrangement whereby the rod and bushing arrangement also maintains a constant elevation of the saw pivot head as the saw blade and motor assembly is moved toward and away from the fence during a cutting operation. It should be understood that the saw blade and motor assembly is pivotable about a saw pivot that is part of the saw pivot head, which is attached to the horizontal hinge linkage. The saw blade and motor assembly can be pivoted up out of contact with a work piece or moved down into contact with a work piece during a cutting operation as is conventional for miter saws.

Such hinge linkages have a cost advantage compared to conventional bushing and rod guides because they have a simpler construction, which may comprise as few as two generally planar shaped linkages that are connected together by shafts that may preferably incorporate rotary bushings or low cost ball bearings and which are also linked to the support frame of the rotatable table as well as to the saw pivot head. Tight tolerance fits between hinge components are relatively easier to achieve using low cost ball bearings that are preloaded in the axial direction so that nearly all axial and radial play is removed. In contrast, conventional bushings and sliding rod systems require expensive manufacturing processes to ensure that the outside surface of the rod is precise over its entire length. Another advantage of the use of hinge linkages is that their stiffness characteristics are determined primarily from the width of the hinge linkages as measured along the pivot, i.e., shaft axis. Thus, increased system stiffness can be achieved by making the hinge larger and this is generally less expensive than using larger rods and bushings.

As previously mentioned, the horizontal hinge linkage pivots around axes that are perpendicular to the cutting plane of the blade and therefore provides increased stiffness along the axis of rotation of the saw blade and because of this desirable characteristic, the length of the hinge shafts is greater than other shaft lengths such as those used in the vertical hinge linkage. The structural stiffness is very important to the quality of cuts made by the saw. Without the requisite structural stiffness, it is common for the saw blade to deflect out of the desired cutting plane on an intermittent basis which can result in one or more cut discontinuities or jagged cut portions, rather than a continuous smooth cut at the desired angle.

Another advantage of the hinge linkage is that it has greatly reduced sensitivity to dirt and grit because the bearing surfaces of a hinge linkage are not exposed but are contained within a ball bearing or short rotary bushing. Such ball bearing or rotary bushings can be relatively easily sealed compared to a rod and bushing system where the entire rod is a critical bearing surface and therefore has to be sealed with a large accordion or bellow shaped fabric or other type of cover which is often easily damaged.

Turning now to the first preferred embodiment shown in FIGS. 1-4, the miter saw, indicated generally at 10, has a generally circular base 12 with an attached fence 14, which base supports a rotatable table 16 that has a miter arm control assembly, indicated generally at 18, for adjusting the rotational position of the table for setting the miter angle of work piece that would be placed on the table 16. A saw blade and motor assembly, indicated generally at 20, is operatively connected to the table 16 by a linear guide mechanism, indicated generally at 22. The saw blade and motor assembly 20 has an electric motor 24 that is operatively connected through a belt and gear mechanism, not shown but located within housing portion 26 that drives a saw blade 28. A handle 30 enables an operator to move the blade and motor assembly 20 into and out of engagement with a work piece that may be placed on the table 16 adjacent the fence 14. The blade and motor assembly 20 is pivotable about a saw pivot shaft 32 that is connected to a saw pivot head 34 to which the linear guide mechanism 22 is attached. The blade and motor assembly 20 is shown in FIG. 1 to be in a position where the blade is moved to its extended position away from the fence 14 and lowered into cutting position where a workpiece is placed on the table 16. During operation, an operator places a work piece on the table 16, brings the handle 30 down into cutting position either before or after activating the motor 24 and then pushes the handle 30 toward the fence 14 to have the blade 28 cut the work piece. At the end of the cut, the blade and motor assembly 20 would be essentially in the position shown in FIG. 2 where the bottom reach of the blade 28 is generally coextensive with the fence 14.

The linear guide mechanism 22 of the first preferred embodiment shown in FIGS. 1-4 is designed so that the miter saw has a dual bevel operation, rather than a single bevel operation, meaning that the bevel angle can be adjusted either right or left from the normal zero angle or position wherein the plane of the blade 28 is perpendicular to the plane of the top surface of the table 16. The blade and motor assembly 20 as well as the linear guide mechanism and rotate about a bevel pivot shaft 36, with the linear guide mechanism having a support frame 38 with a generally cylindrical end portion 40 to which the bevel pivot shaft 36 is connected to. The shaft 36 extends through an opening in an enlarged extension 42 of the table 16. Thus, the end portion 40 can rotate relative to the extension 42 and be supported by the shaft 36. The support frame 38 is preferably a casting that has a lower flange 44, an upper flange 46 as well as vertically oriented flanges 48 and 50.

A horizontal hinge linkage is comprised of links 52 and 54 which have adjacent ends connected together by a shaft 56. The saw pivot head 34 has a pair of spaced flanges 58 as well as a single flange 60 located below the flanges 58. The link 54 has its opposite end connected to the flanges 58 by a shaft 62. Similarly, the opposite end of the link 52 is connected to the vertical flanges 48 and 50 by a shaft 64. As previously mentioned and while not specifically illustrated, the shafts 32, 62, 56, 64, 78 and 82 are preferably of the type which utilize rotary bushings or low cost ball bearings so that they are freely rotatable and will have an extended useful life.

Figure 2:
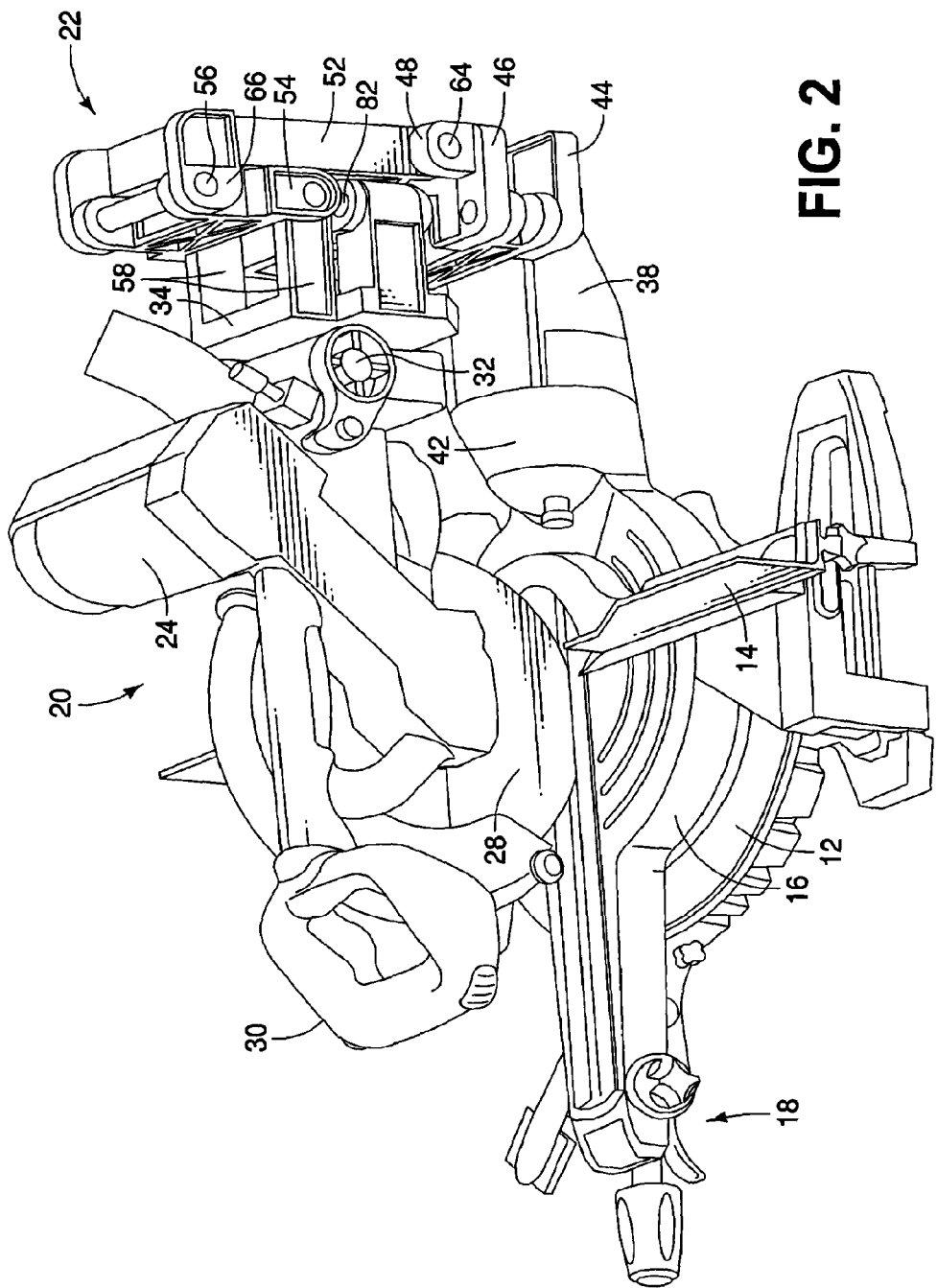
FIG. 2 is a right side perspective view of the embodiment shown in FIG. 1, but illustrating the saw blade in a position near the fence.
Figure 3:
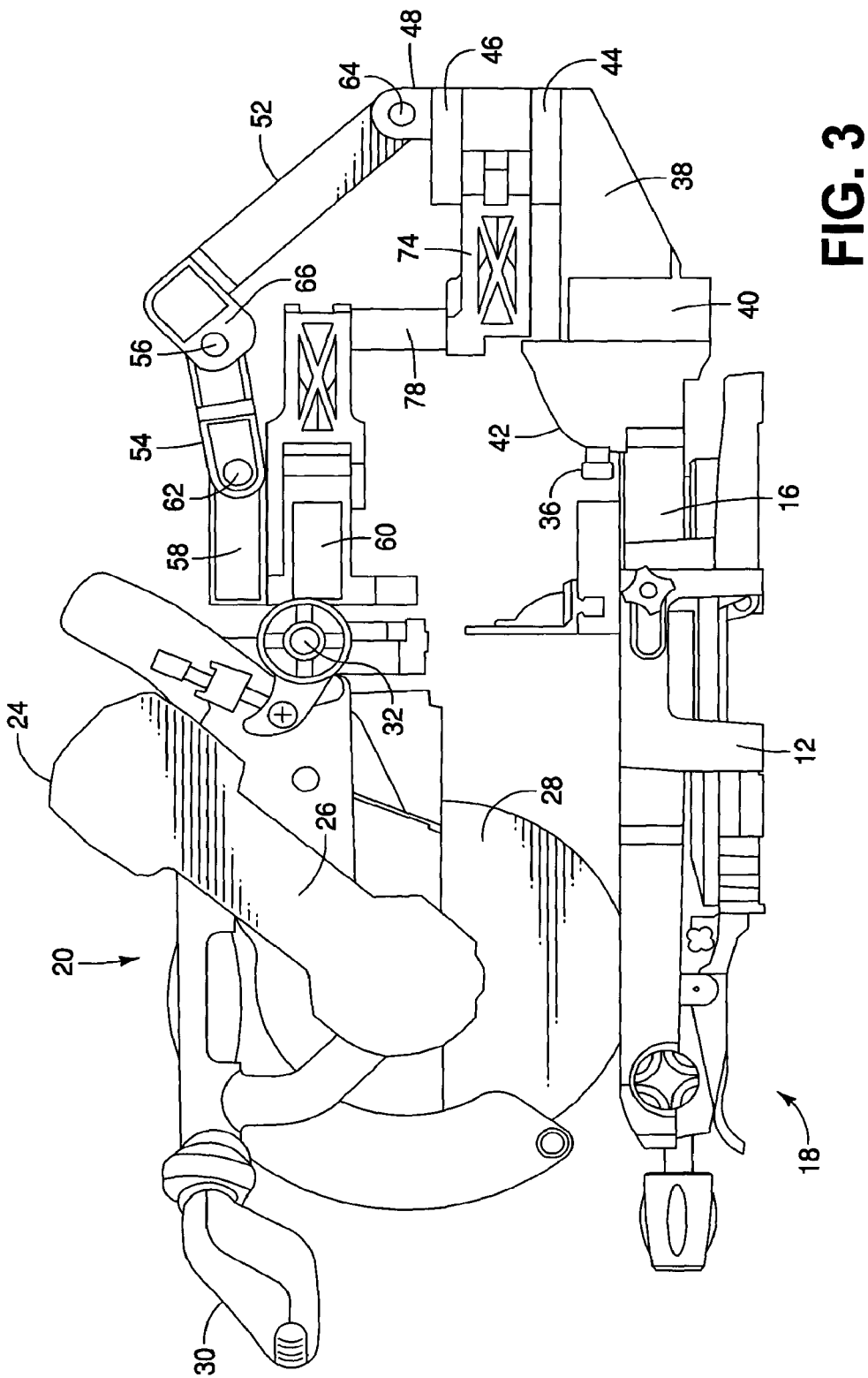
FIG. 3 is a side elevation of the embodiment shown in FIG. 1 with the saw blade in the extended position away from the fence.
Figure 4:
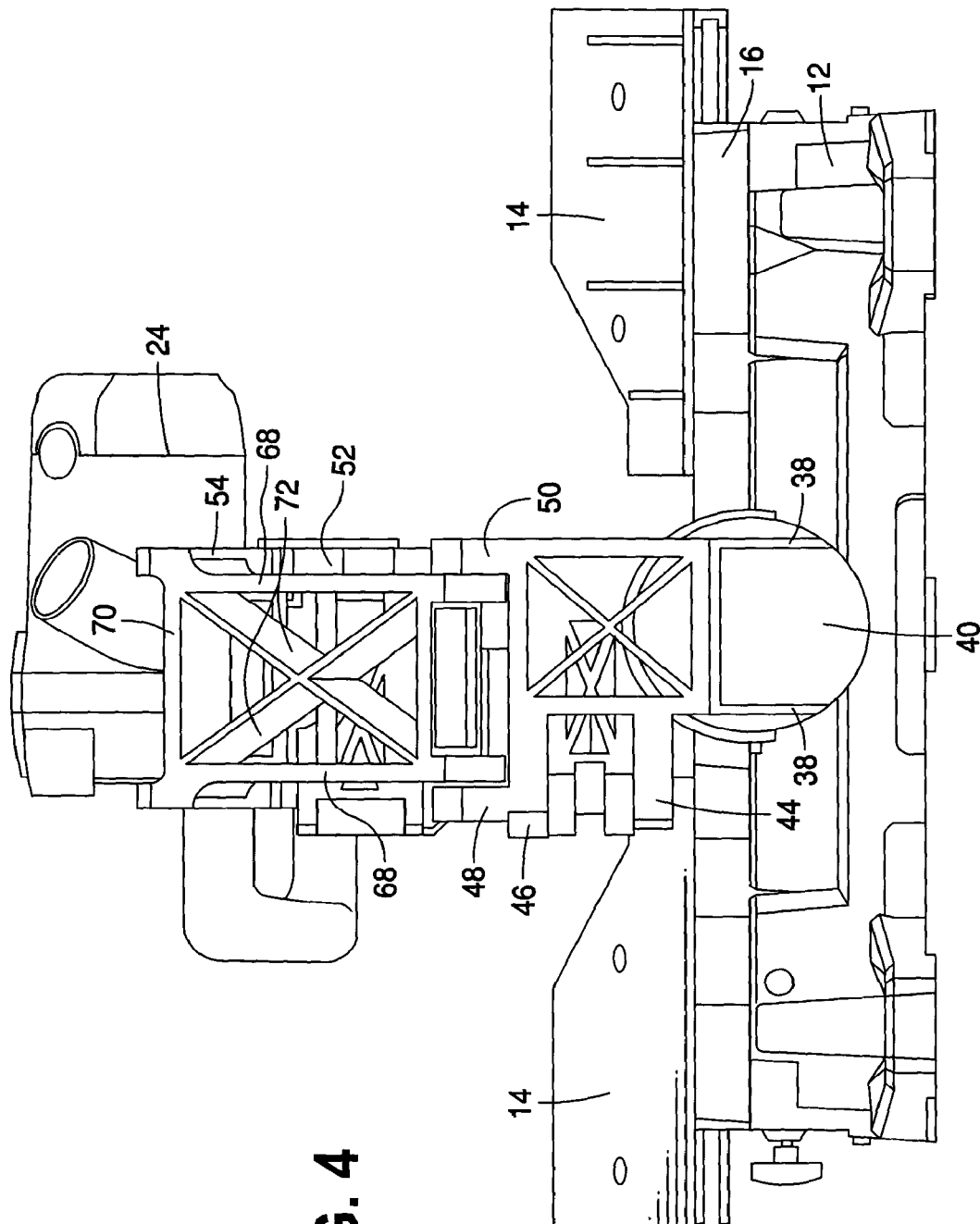
FIG. 4 is a rear view of the embodiment shown in FIG. 1, with the saw blade away from the fence.
Figure 5:
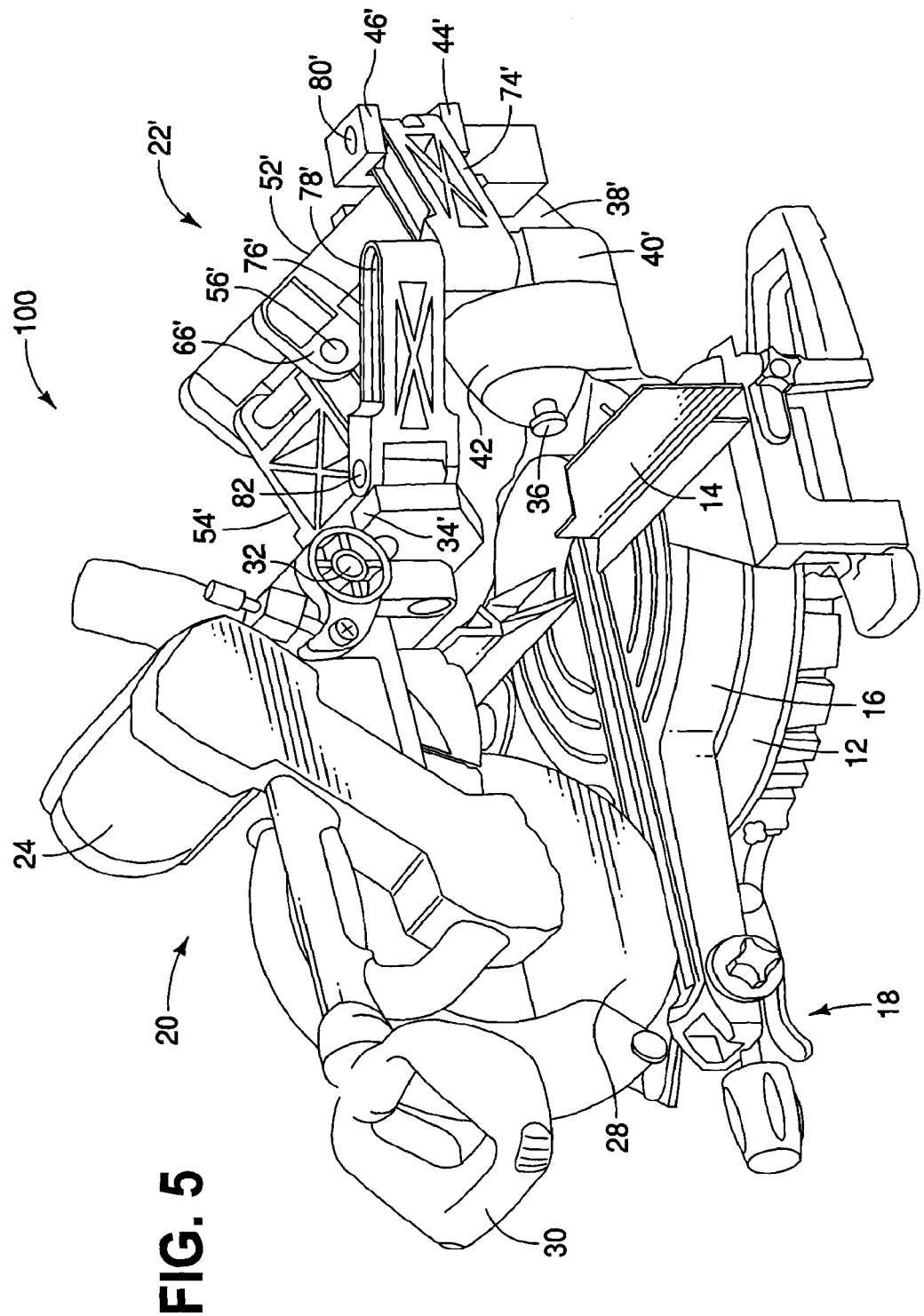
FIG. 5 is a right front perspective view of a second preferred embodiment of the present invention, particularly illustrating the saw blade being located in the extended position away from the fence.

As is best shown in FIGS. 1 and 2, the link 52 has a generally L-shaped side configuration with the transverse extension 66 having the aperture in which the shaft 56 is located. This permits the two links 52 and 54 to be folded together in a generally parallel arrangement as shown in FIG. 2 when the blade and motor assembly 20 is moved into its final cutting position where the blade is adjacent to the fence 14. As is best shown in FIG. 4, the width of the links 52 and 54 is relatively large and therefore the shafts 56, 62 and 64 that interconnect the links 52 and 54 with one another and with the saw pivot head 34 and support frame 38 are relatively long. This contributes to the desirable stiffness of the linear guide mechanism which substantially reduces, if not eliminates, any movement by the blade out of the cutting plane which can result in poor quality cutting. Stated in other words, the extremely wide links and their coupling to the saw pivot head and support frame 38 results in high rigidity reducing torsional and linear deflection of the saw blade away from its intended cutting plane which is very desirable from a cut quality standpoint.

As best shown in FIG. 4, the link 52 is not a solid construction, but has side walls 68 and end walls 70 with cross braces 72 provided to provide increased overall strength for the link. The link 54 is similarly constructed as is shown in FIG. 1, it also having similarly configured side walls, end walls and cross braces. The hinge links 52 and 54 are preferably die cast aluminum but can be steel stamping if desired.

The vertical hinge linkage is located below the horizontal hinge linkage and it comprises links 74 and 76 which have adjacent ends connected together by a vertical shaft 78. The links 74 and 76 are not as wide as the horizontal hinge links 52 and 54 for the reason that their functionality is to maintain the elevation of the saw pivot head 34 constant during movement of the blade and motor assembly 20 toward and away from the fence 14. Elevational deflections are not as critical for a miter saw cut quality for the reason that the work piece is generally being completely cut through.

The narrower links 74 and 76 are vertically displaced from one another which requires the elongated vertical shaft 78 to extend to interconnect them. The link 74 is located between the horizontal flanges 44 and 46 and is pivotally connected to these flanges by a shaft 80. Similarly, the link 76 has spaced flange portions that are connected to the flange 60 by a shaft 82. As is shown in FIG. 1, the flange 60 is located beneath the near flange 58 and the flanges 44 and 46 are also located beneath the vertical flanges 48 and 50, and the shaft 78 that interconnects the links 74 and 76 extends away or to the left side of the saw (as viewed from the handle 30) so that when the vertical and horizontal linkages are folded together as shown in FIG. 2, little if any portion of the links extend outside of the width of the flanges 48 and 50. This is significant in that changing of the bevel angle of the blade and motor assembly 20 can be accomplished in either the left or right direction and the hinge linkages will not interfere with the dual bevel adjusting capability.

It should also be apparent from FIG. 2 that when the blade and motor assembly 20 are moved as far toward the fence 14 as is possible, the linkages do not extend in any rearward direction beyond the original position end of the support frame 38. This enables the miter saw to be placed near a wall, for example, and be fully operational, unlike many conventional sliding rod and bushing configurations of compound miter saws.

A second preferred embodiment is shown in FIGS. 5-8 and have many similar components as the embodiment shown in FIGS. 1-4. In the following description, components that are labeled with the same numbers as those shown and described with regard to the first preferred embodiment are substantially similar in their design, configuration and operation and therefore will not be described in detail. Components with reference numbers having a prime or double prime designation are similar to those that are identified with regard to the embodiment shown in FIGS. 1-4, but may have some structural differences which are apparent or which will be generally described, or which will be given different numbers than those illustrated in FIGS. 1-4.

Figure 6:
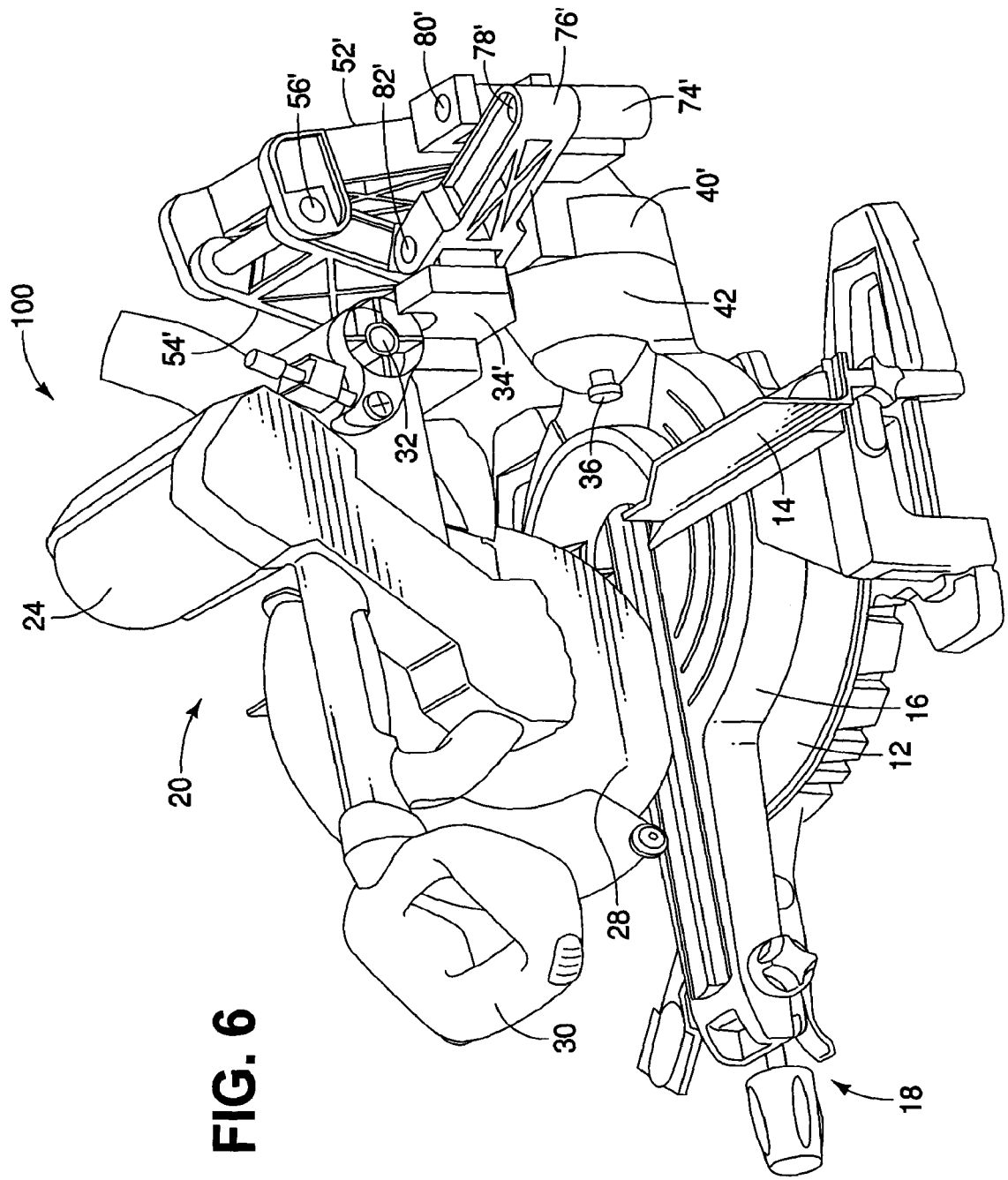
FIG. 6 is a right front perspective view of the embodiment shown in FIG. 5, but illustrating the saw blade in a position near the fence.
Figure 7:
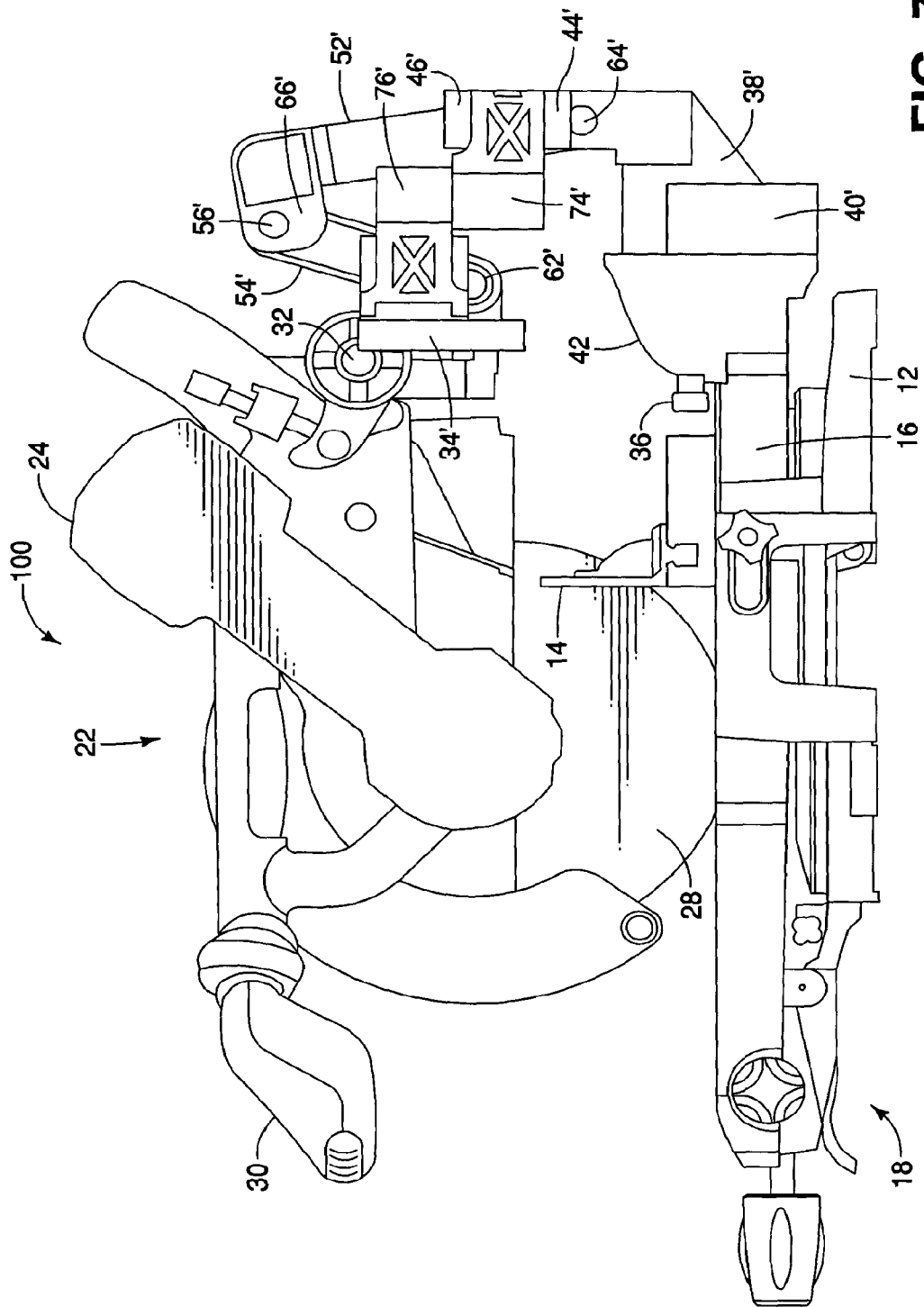
FIG. 7 is a side elevation of the embodiment shown in FIG. 5 but illustrating the saw blade in a position near the fence.
Figure 8:
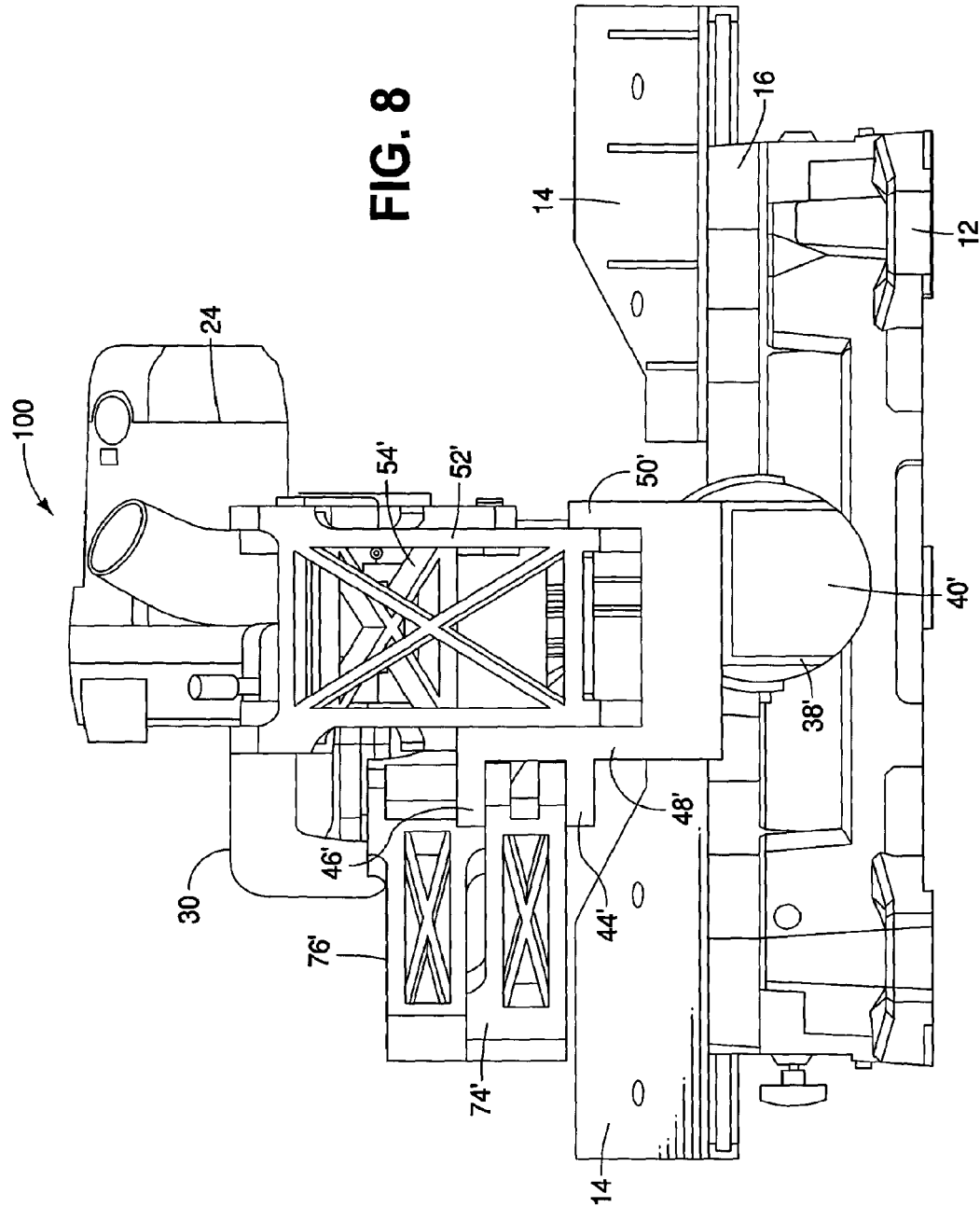
FIG. 8 is a rear view of the embodiment shown in FIG. 5, with the saw blade in a position away from the fence.
Figure 9:
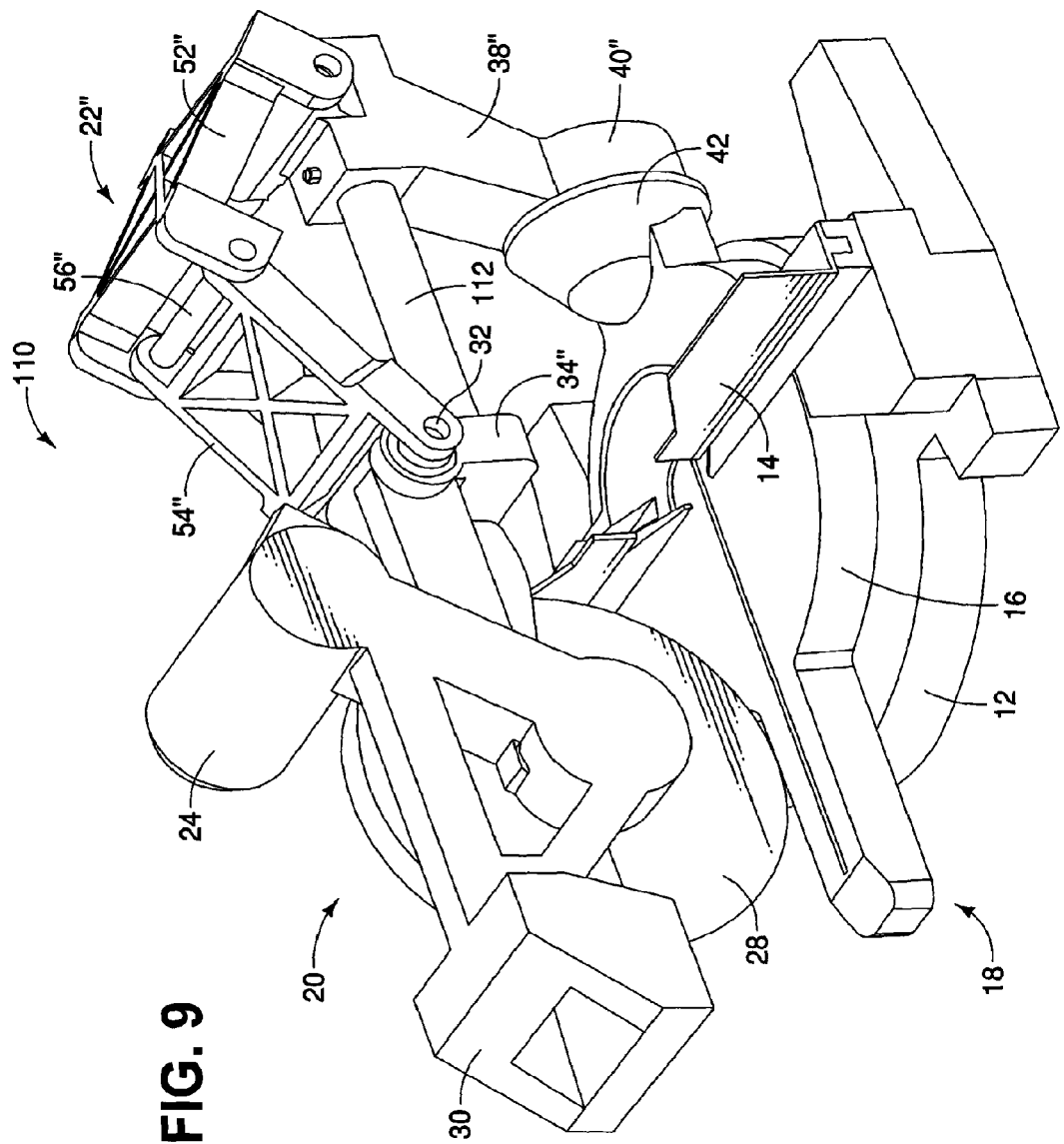
FIG. 9 is a third preferred embodiment of the present invention, particularly illustrating the saw blade being located in the extended position away from the fence.
Figure 10:
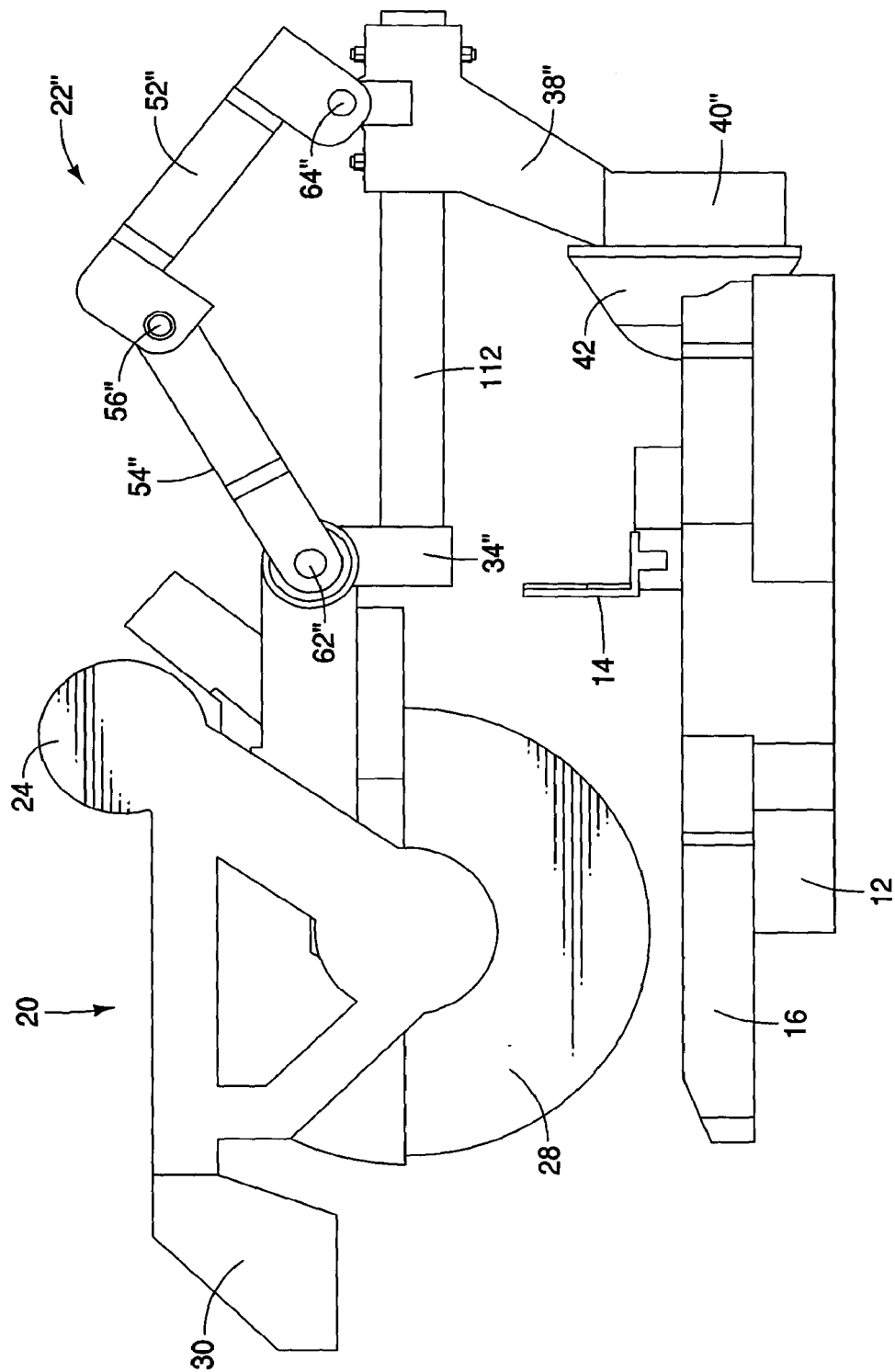
FIG. 10 is a side elevation of the embodiment shown in FIG. 9 with the saw blade in the extended position away from the fence.
Figure 11:
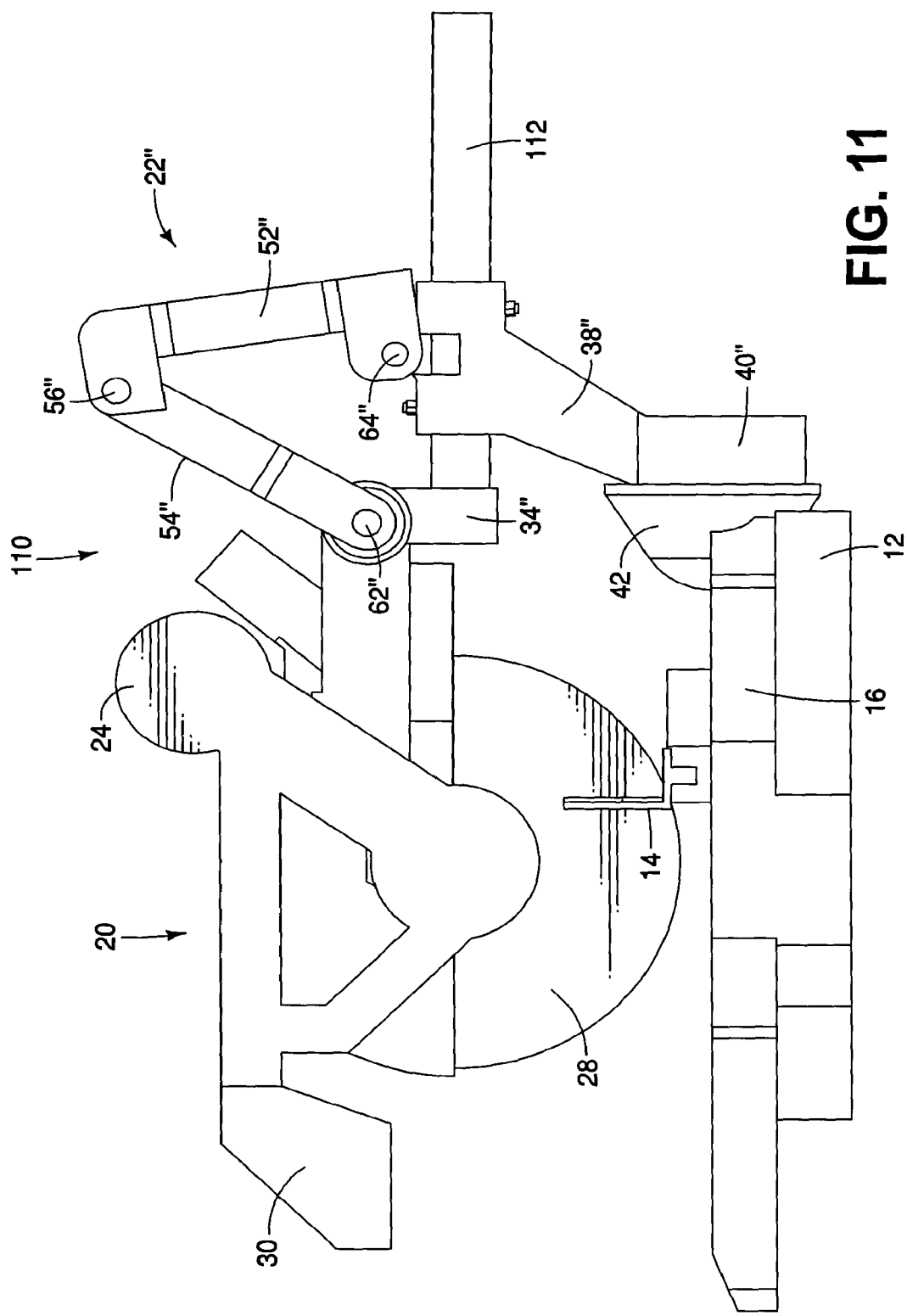
FIG. 11 is another side elevation of the embodiment shown in FIG. 9, with the saw blade near the fence.
Figure 12:
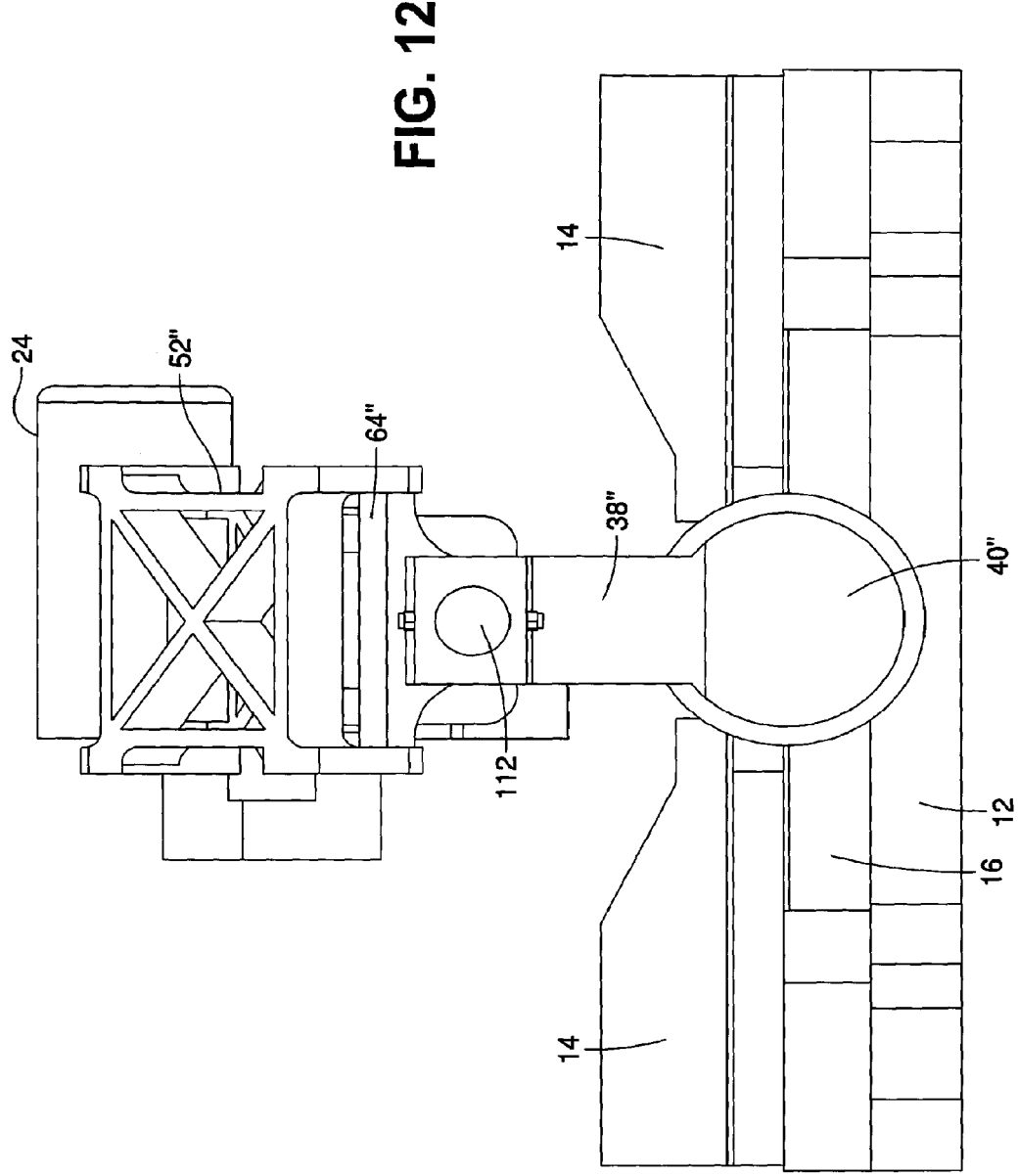
FIG. 12 is a rear view of the embodiment shown in FIG. 9, with the saw blade located away the fence.

The second preferred embodiment is indicated generally at 100 in FIGS. 5-8 and has many similarities to the first preferred embodiment, but while the first embodiment is a dual bevel configuration saw, the second embodiment saw 100 is a single bevel configuration. The links 74' and 76' are connected together by a shaft 78' that is not as long as the shaft 78 of the first preferred embodiment, because the links 74' and 76' are vertically adjacent one another rather than being spaced apart. Also, the link 76' is at an elevation that is substantially similar to the elevation of the link 54' and therefore unable to fold toward the link 52" and 54'. Thus, the connection between link 74' and 76' extends outwardly away from the links 52' and 54'. Because of the outward extension, particularly when it is folded as shown in FIGS. 6 and 8, the links interfere with other portions of the saw 100 when the saw would be pivoted in the counterclockwise direction as shown in FIG. 8. Therefore, the single bevel operation of this second preferred embodiment is in the clockwise direction as shown in FIG. 8.

A third preferred embodiment of the invention is the saw 110 that is shown in FIGS. 9-12 is less detail than the embodiments of FIGS. 1-8. Saw 110 has a horizontal hinge linkage comprising links 52" and 54" that are interconnected and operate substantially similar to those described in the embodiments of FIGS. 1-8. The saw pivot head 34" has a slightly different configuration and the end of the link 54" is connected to the saw pivot shaft 32 which is also journaled in the saw pivot head 34". An elongated rod 112 is journaled in a bushing (not shown but located in the upper end of support frame 38) and maintains the saw pivot head 34" at a constant elevation as the blade and motor assembly 22 moves the blade 28 toward the fence 14. Only one rod 112 is provided for the reason that control of the saw blade cutting plane is provided by the horizontal hinge linkage, as is the case with the other embodiments shown in FIGS. 1-8, and the only function that is performed by the rod 112 is to keep the pivot head 34" at a constant elevation during operation. In this regard, the blade and motor assembly 20 is shown in its retracted position in FIGS. 9 and 10 and in the cutting position in FIG. 11 where the blade 28 is adjacent the fence 14. In the position shown in FIG. 11, it is apparent that the rod 112 will extend beyond the rear surface of the support frame 38" which requires a larger footprint in that it would not be possible to place the saw 110 with the support frame 38" located close to a wall or other similar surface. Thus, while this embodiment does not have the space advantages of the first and second preferred embodiments, this embodiment has the advantage of controlling the saw blade cutting plane by a generally horizontal hinge as is achieved in all embodiments and only one rod and bushing combination is required which provides a cost benefit compared to conventional arrangements which have a pair of rod and bushing configurations.

Another described embodiment of the miter saw is shown in FIGS. 13-19 and is indicated generally at 200. This embodiment is also described in related U.S. application Ser. No. 13/194,687, which is hereby incorporated by reference it its entirety. Many of the components are similar to the first embodiment 10 so that where reference numbers are the same as the description of the FIG. 1, such components and their functionality are very similar, if not identical. Components with reference numbers above 200 are sufficiently different from analogous components of the other embodiments to warrant separate numbers or are new in the fourth preferred embodiment.

Figure 13:
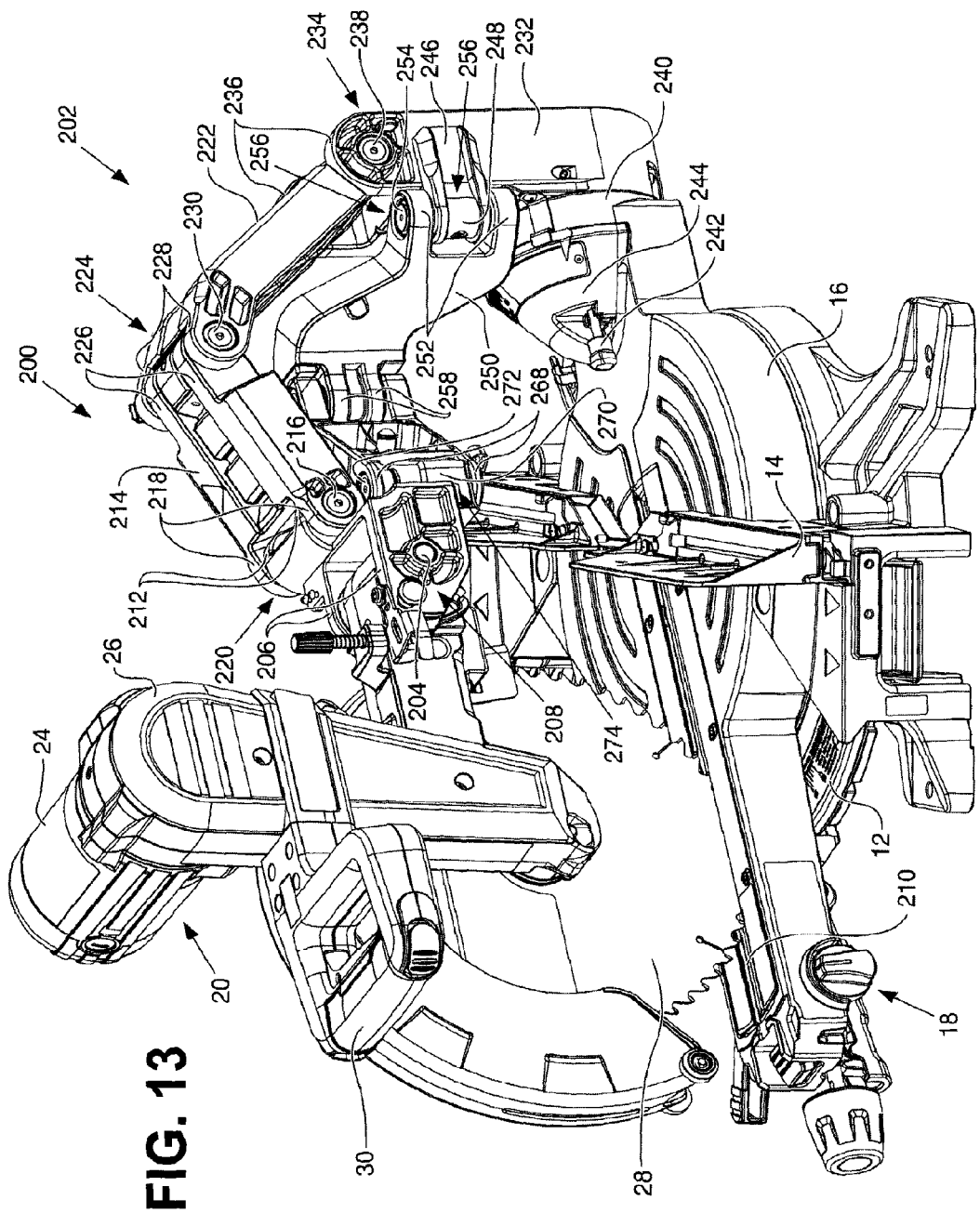
FIG. 13 is a perspective view of the right side of a miter saw, with the blade and motor assembly in an extended and lowered position, in accordance with another embodiment of the invention.
Figure 14:
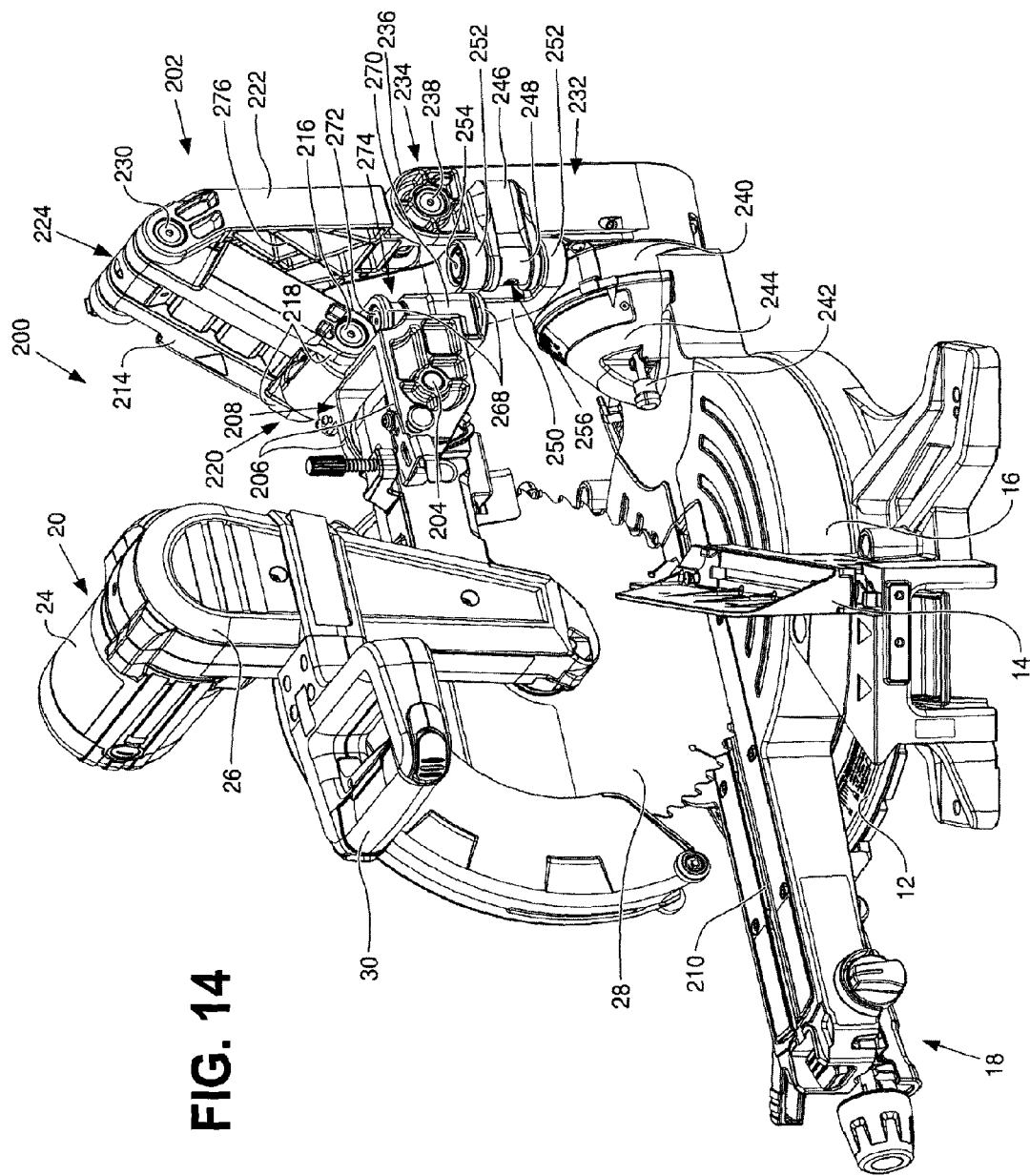
FIG. 14 is a perspective view of the right side of the miter saw shown in FIG. 13, with the blade and motor assembly in a retracted and lowered position.

Turning to FIGS. 13 and 14, the miter saw 200 also has a generally circular base 12 with an attached fence 14. The base 12 supports a rotatable table 16 that has a miter arm control assembly, indicated generally at 18, for adjusting the rotational position of the table for setting the miter angle of a workpiece that would be placed on the table. A saw blade and motor assembly, indicated generally at 20, is operatively connected to the table 16 by a linear guide mechanism, indicated generally at 202. The saw blade and motor assembly 20 has an electric motor 24 that is operably connected through a belt and gear mechanism (not shown), but located within the housing portion 26 that drives a saw blade 28. A handle 30 enables the operator to move the blade and motor assembly 20 into and out of engagement with a workpiece (not shown) that is placed on the table 16 adjacent the fence 14.

The blade and motor assembly 20 is pivotable about a saw pivot connection shaft 204 extending between a pair of spaced outer flanges 206 on a pivot head 208. When the handle 30 is lowered by an operator, the blade 28 will be lowered into its cutting position and slightly penetrates a slot 210 formed in the table 16. The pivot head 208 also has a pair of spaced inner flanges 212 (best shown in FIG. 13) that extend in the opposite direction from the outer flanges 206 that are connected to the blade and motor assembly 20, and offset from the center of the pivot head 208, opposite one of the outer flanges 206. The inner flanges 212 are provided between a pair of spaced outer flanges 218 extending from one end of a first horizontal link 214. A pivot connection shaft 216 extends horizontally through holes in the inner and outer flanges 212 and 218 to pivotally connect the inner and the outer flanges 212, 218. Together the inner flanges 212 of the pivot head 208, the pivot connection shaft 216 and the outer flanges 218 of the first horizontal link 214 form a horizontal hinge connection 220.

At the opposite end from the horizontal hinge connection 220, the first horizontal link 214 is connected to a slightly longer second horizontal link 222 by another horizontal hinge connection 224. It should be understood, however, that the miter saw 200 may include one or more additional horizontal links that may be connected to the first and second links 214, 222 without departing from the scope of the patent. Included in the hinge connection 224 is a pair of spaced inner flanges 226 that extend from the end of the first horizontal link 214 opposite the end having outer flanges 218. The inner flanges 226 are provided between and pivotally connected to a pair of spaced outer flanges 228 extending from the upper end portion of the second horizontal link 222, by a pivot connection shaft 230.

The second horizontal link 222 has its lower end portion connected to a vertical support 232 by a horizontal hinge connection 234. The hinge connection 234 includes a pair of spaced outer flanges 236 (best shown in FIG. 15) extending from the top of the vertical support 232 and a pair of inner flanges (not shown) extending from the lower end of the horizontal link 222 and provided between the outer flanges of the vertical support. A pivot connection shaft 238 extends through the outer flanges 236 of the vertical support 232 and the inner flanges of the second horizontal link 222 for a pivotal connection. The outer flanges 228 of the second horizontal link 222 in the hinge connection 224 extends at an angle of approximately 30 degrees from the generally linear longitudinal portion of the second horizontal link to enable the first horizontal link 214 to be folded close to the second horizontal link, as shown in FIG. 14. It is to be understood that the angle other than the described above may be utilized as well.

Figure 16:
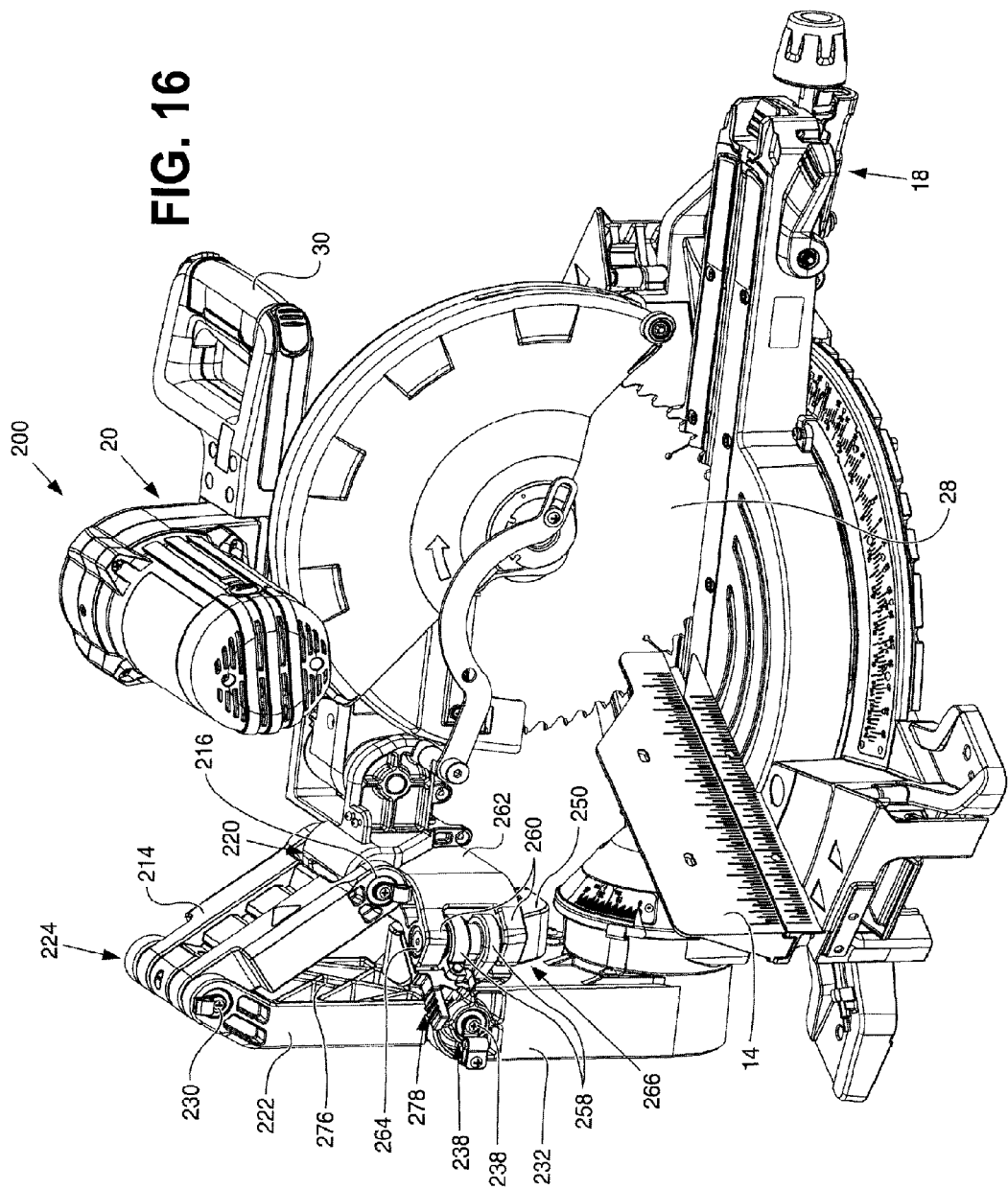
FIG. 16 is a perspective view of the left side of the miter saw shown in FIG. 13, with the blade and motor assembly in the retracted and lowered position.

As is best shown in FIGS. 14 and 16, when the blade and motor assembly 20 is in its retracted position, the second horizontal link 222 is in a generally vertical orientation. It should be appreciated that the horizontal pivot connection shafts 216, 230, 238, and the corresponding hinge connections 220, 224, 234, are oriented parallel to one another and substantially perpendicular to the plane of the blade 28. The first and second horizontal links 214, 222 are relatively wide, approximately 80 to 160 millimeters and the thickness of them is substantial, approximately 10 to 80 millimeters so that they resist bending which would detrimentally affect the quality of the cut by the blade 28. The length of the first horizontal link 214 is approximately ¾ of the length of the second horizontal link 222. In one embodiment, the length of the first horizontal link 214 is approximately 120 to 220 millimeters and that of the second horizontal link 222 is approximately 200 to 300 millimeters so that the point of the blade 28 that make contact with the workpiece is at a sufficient distance from the fence 14 to cut the intended workpiece, but before the contact point reaches the end of the slot 210 provided in the table 210. Of course, it should be understood that the width, the thickness, and the length of the first and second links 214, 222 other than those described above may be utilized as well.

The vertical support 232 is integrally formed with a support frame 240 that is generally cylindrically shaped. Of course, the support frame 240 may take the form of various shapes and have a number of different sizes. A bevel pivot shaft 242 supported by an extension 244 of the table 16 enables the support frame 240 and the vertical support 232 to pivot either to the left or right of the plane of the blade 28 for the purpose of providing bevel cuts. The vertical support 232 also has a side mounting structure 246 with a pivot block 248 for pivotally supporting an angled first vertical link 250, which has a pair of outer flanges 252 at one end. The pivot block 248 is provided between and connected to the two outer flanges 252 of the first vertical link 250 by a vertical pivot connection shaft 254 that extends through the holes formed in the outer flanges and the pivot block. The outer flanges 252, the pivot block 248 and the pivot connection shaft 254 combine to form a vertical hinge connection 256. It should be noted that the pivot block 248 can be an integral part of the vertical support 232, or it can be a separate component that is affixed to the vertical support 232.

Figure 15:
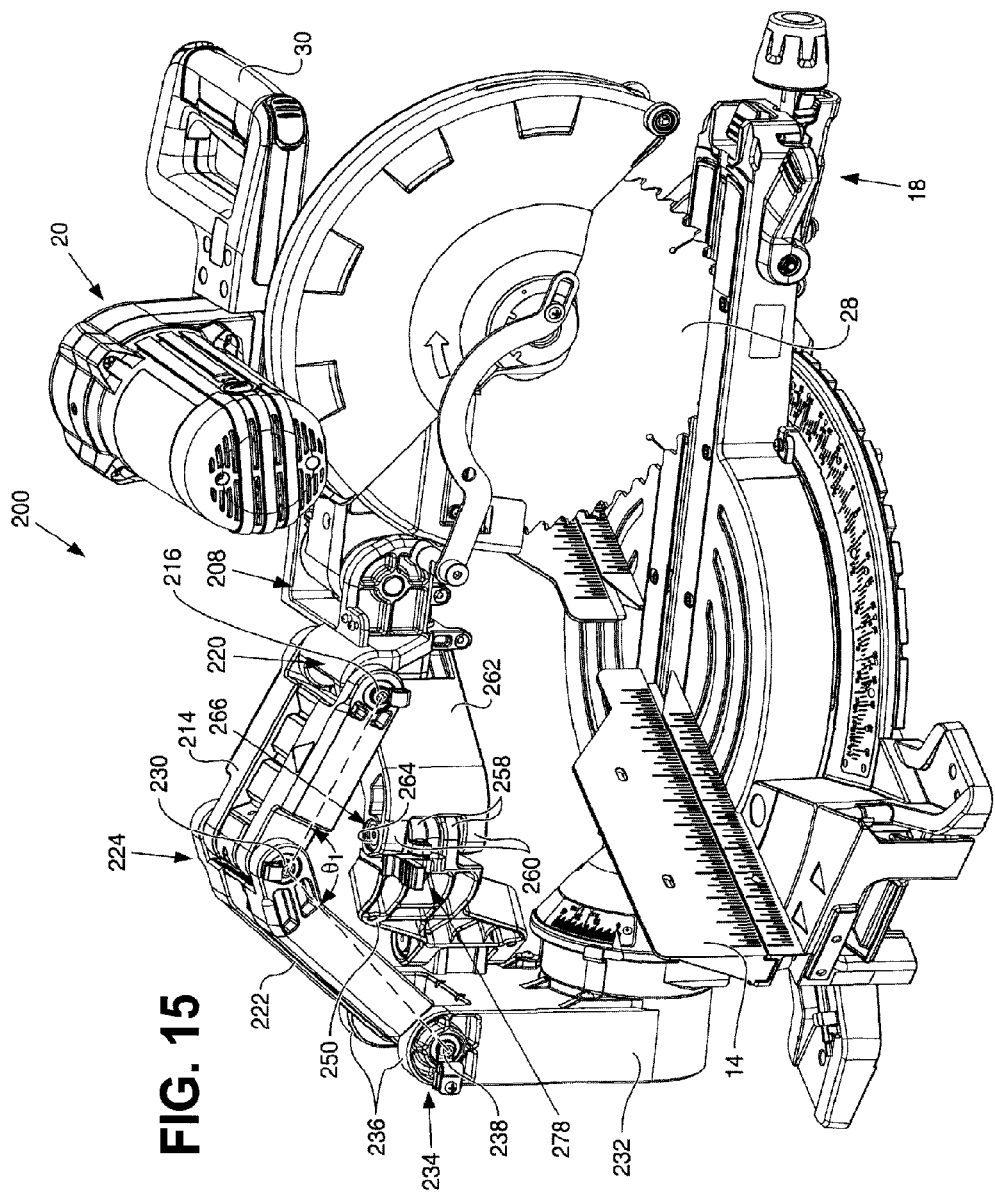
FIG. 15 is a perspective view of the left side of the miter saw shown in FIG. 13, with the blade and motor assembly in an extended position.

Referring to FIGS. 13, 15 and 16, the first vertical link 250 has a pair of spaced inner flanges 258 extending from the end opposite the end having the outer flanges 252. The inner flanges 258 are provided between a pair of spaced outer flanges 260 extending from a second vertical link 262. A vertical pivot connection shaft 264 extends through the aligned holes in the inner and outer flanges 258, 260 to pivotally connect the first and second vertical links 250, 260 together and form a vertical hinge connection 266. While the inner flanges 258 are described as being "spaced," it should be understood that they are not necessarily separated. They can also be integrally connected by a somewhat narrower piece provided between the flanges 258. Alternatively, the inner flanges 258 can also be replaced with one cylindrical piece protruding from the end of the link 250. As best shown in FIG. 15, the outer and the inner flanges 260, 258 of the second vertical link 262 and the first vertical link 250 extend at a slight angle from the linear portion of each of the first and second vertical links 250, 262 to enable the first and second vertical links 250, 262 to be folded close to each other, as shown in FIG. 16. Preferably, the flanges 258, 260 should extend at an angle of approximately 30 to 120 degrees relative to the linear portion of the respective first and second vertical links. It is to be understood that the angle other than the described above may be utilized as well.

At the opposite end from the outer flanges 260, a pair of spaced outer flanges 268 extend from the second vertical link 262 and are pivotally connected to a pivot block 270 provided between the two outer flanges by a vertically oriented pivot connection shaft 272 (best shown in FIGS. 13 and 14), thereby forming another vertical hinge connection 274. The pivot block 270 is attached to the pivot head 208 on the opposite side from the outer flanges 206 and adjacent the inner flanges 212 of the pivot head.

As with the embodiment shown in FIG. 13, the vertical pivot connection shafts 254, 264, 272 maintain the elevation of the pivot head 206 substantially constant relative to the table 16. The length of the first vertical link 250 is approximately the same as the length of the second vertical link 262, and each of the first and second vertical links 250, 262 are approximately 7/10 of the length of the second horizontal link 222. In one embodiment, the length of the first vertical link 250 is approximately 120 to 220 millimeters and that of the second vertical link 262 is also approximately 120 to 220 millimeters. The width and thickness of the first and second vertical links 250, 262 are comparable to the first and second horizontal links 214, 222. However, the amount of possible bending of the vertical links 250, 262 is not as critical as bending that could occur with the horizontal links 214, 222 inasmuch as the quality of a cut is generally not affected by vertical movement of the blade during extension and retraction because the blade penetrates the slot 210 during most cutting operations. Of course, it is to be understood that the width, the thickness, and the length of the first and second links 214, 222 other than those described above may be utilized as well. As is evident from the drawings, the horizontal and vertical links 214, 222, 250, 262 are not solid but may be constructed from cast of aluminum and have reinforcing ribs 276 (best shown in FIG. 14) that extend across the interior of the links to impart additional strength. In some embodiments, the horizontal and vertical links 214, 222, 250, 262 may be constructed from steel stamping, sheet metal, or any high strength plastic.

Additional structural strength is provided with the fourth embodiment for the reason that all the horizontal and the vertical hinge connections 220 224, 234, 256, 266, 274 have outer flanges that fit outside a pair of inner flanges or pivot blocks, which support each the horizontal and vertical links 214, 222, 250, 262 at both ends rather than an overhung load connection. The double-ended support provides a stronger connection that imparts an increased strength to the links. The horizontal and vertical pivot connection shafts 216, 230, 238, 254, 264, 272 are, therefore, also supported at opposite ends, which is a stronger connection.

In the described fourth embodiment, the vertical hinge connection 256 at the lower end of the first vertical link 250 is provided at the top portion of the vertical support 232 (not including the outer flanges 236) and is slightly below the vertical hinge connection 266 at the other end of the vertical link 250 (best shown in FIG. 14). Accordingly, the vertical link 250 extends at an angle between the vertical hinge connections 256 and 266. It should be understood, however, that the length of the vertical support 232 may be increased so that the location of the pivot block 248, and accordingly, the vertical hinge connection 256, may be at the same height as the vertical hinge connection 266. In other words, the first vertical link 250 may extend substantially parallel to the table top 16 as is the second vertical link 262. However, with this arrangement, there may be an issue of the miter saw 200 being undesirably top heavy.

Another consideration is that the angle between the first and second horizontal links 214, 222 as determined by the line of action between a line extending through pivot connection shafts 230 and 216 in the horizontal hinge connections 224 and 220 relative to the line of action through pivot connection shafts 230 and 238 in the horizontal hinge connections 224 and 234, identified as angle $\theta_1$ in FIG. 15 should be less than 130° when the saw is fully extended to prevent a toggle action of the links. While not shown, the angle between the first and second vertical links 250 and 262 as determined by the line of action between a line extending through vertically oriented pivot connection shafts 264 and 254 in the vertical hinge connections 266 and 256 relative to the line of action through vertical pivot connection shafts 264 and 272 in the vertical hinge connections 266 and 274, also should be less than 130° when the saw is fully extended to prevent a toggle action of the links. The toggle action is defined herein to mean an increased necessary force to push the blade and motor assembly 20 from its extended position, shown in FIGS. 13 and 15 toward the retracted position shown in FIGS. 14 and 16. If a toggle action is experienced, a greater noticeable and appreciable force is required to start the movement. If the angles of the links are less than 130°, such toggle action is not experienced.

During operation, an operator places a workpiece on the table 16, brings the handle 30 down into cutting position either before or after activating the motor 24, as shown in FIGS. 13 and 15, and then pushes the handle 30 toward the fence 14 to have the blade 28 cut the workpiece. At the end of the cut, the blade and motor assembly 20 would be essentially in the position shown in FIGS. 14 and 16, where the bottom reach of the blade 28 is generally coextensive with the fence 14.

Figure 19:
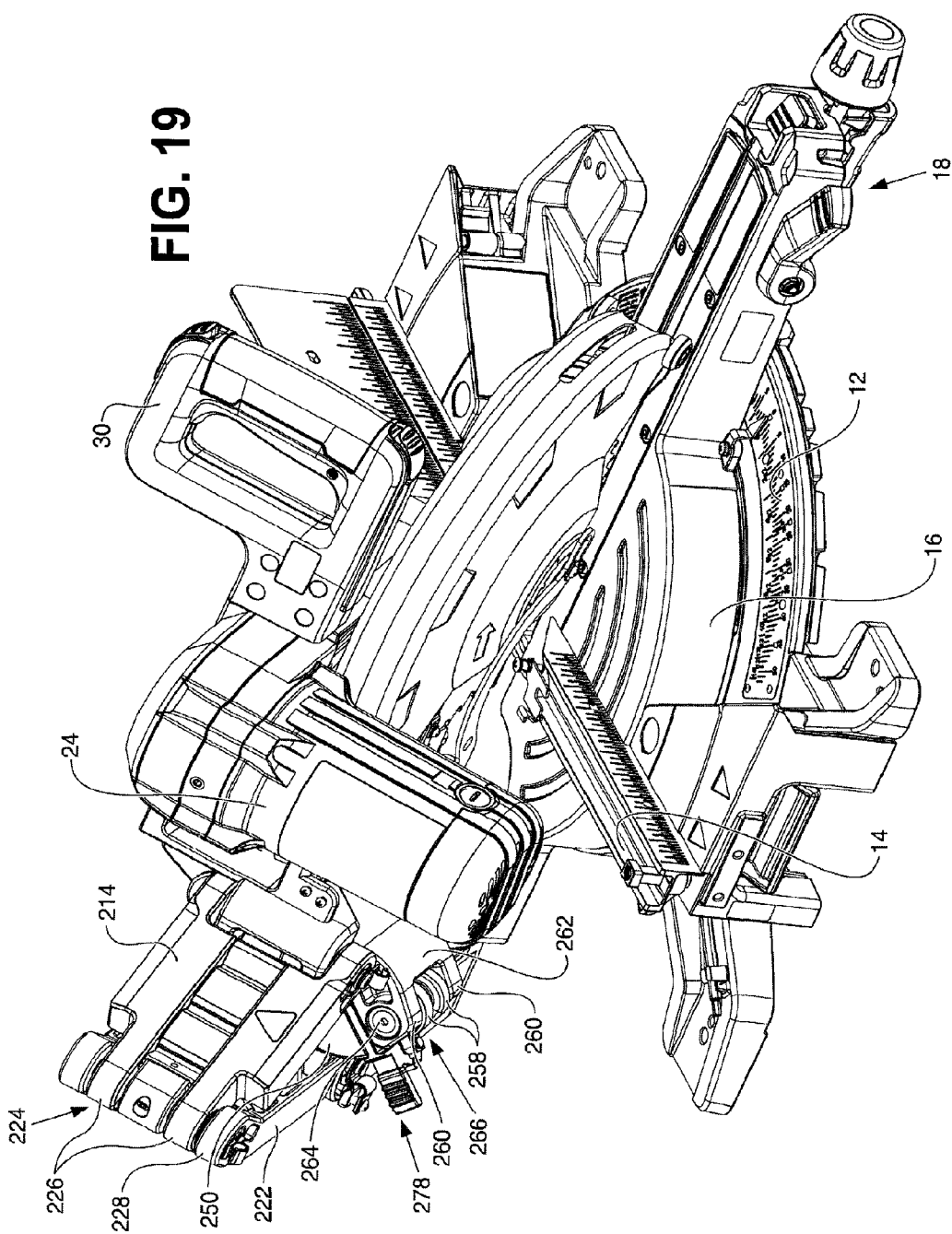
FIG. 19 is a perspective view of the left side of the miter saw shown in FIG. 13, with the blade and motor assembly beveled to the left side.

As is shown in FIGS. 15 and 16, the first and second vertical links 250, 262 are located beneath the first and second horizontal links 214, 222 and the vertical connection hinge 266 that interconnects the vertical links extends away or to the left side of the saw (as viewed from the handle 30). In this manner, when the saw 200 is in a retracted position and the vertical and horizontal links 214, 222, 250, 262 are folded together, as shown in FIGS. 16-19, only a small portion (e.g., approximately 20 to 100 millimeters) of the vertical links 250, 262 extend outside of the width of the horizontal links 214, 222. This is significant in that changing of the bevel angle of the blade and motor assembly 20 can be accomplished in either the left or right direction and the vertical links 250, 262 will not interfere with the dual bevel adjusting capability, as illustrated in FIG. 19.

Figure 17:
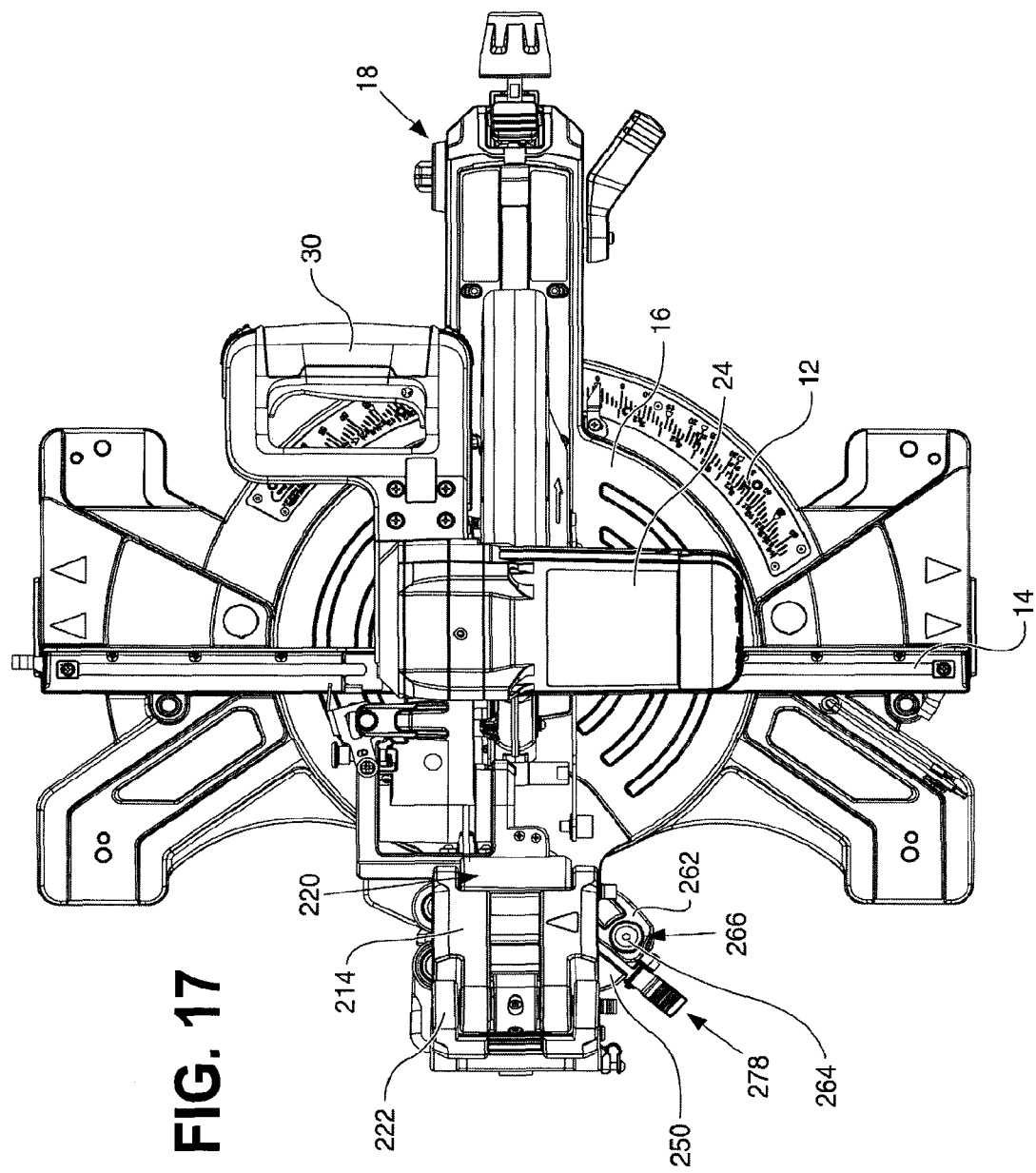
FIG. 17 is a top plan view of the miter saw shown in FIG. 13, with the blade and motor assembly in the retracted and lowered position and the blade being perpendicular to the fence.
Figure 18:
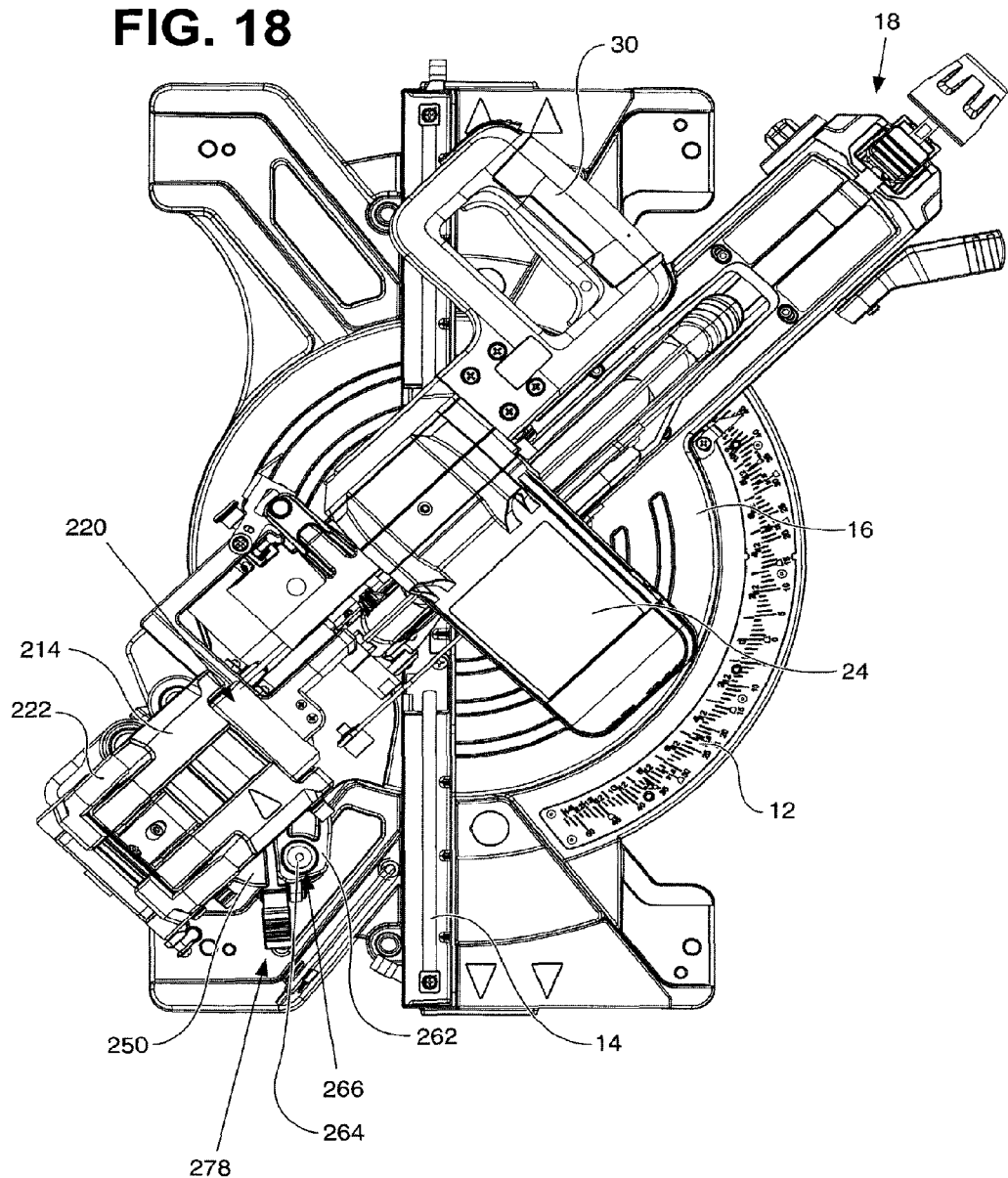
FIG. 18 is a top plan view of the miter saw shown if FIG. 13, with the blade and motor assembly in the retracted and lowered position and the blade being at a miter angle to the fence.

Another desirable attribute of this described embodiment is particularly illustrated in FIGS. 14, 16 and 17 wherein the blade and motor assembly 20 is in its retracted position and the second horizontal link 214 is substantially vertical. Since the link 214 does not extend rearwardly beyond the vertical support 232, it can be appreciated that the saw 200 can be placed very close to a rear wall or the like without impairing the normal operation of the saw.

Optionally, one or more of the hinge connections in any of the embodiments, such as hinge connection 224 of the embodiment shown in FIGS. 13-19, includes a glide movement controller 310, which is shown in detail in FIGS. 20-24. The glide movement controller 310 is used for controlling the smoothness of the saw's glide action. In the various embodiments of the linear guide mechanism described above, the gliding action of the blade and motor assembly 20 with respect to the table 16 is very smooth, and thus only minimal pressure upon the handle 30 is required for moving assembly 20. Accordingly, there may be certain situations where the user desires more force to be required to accomplish such gliding movement, so that the saw does not move more easily than desired. Thus, as explained next, the glide movement controller 310 creates some resistance to such gliding movement of the linear glide mechanism.

Figure 20:
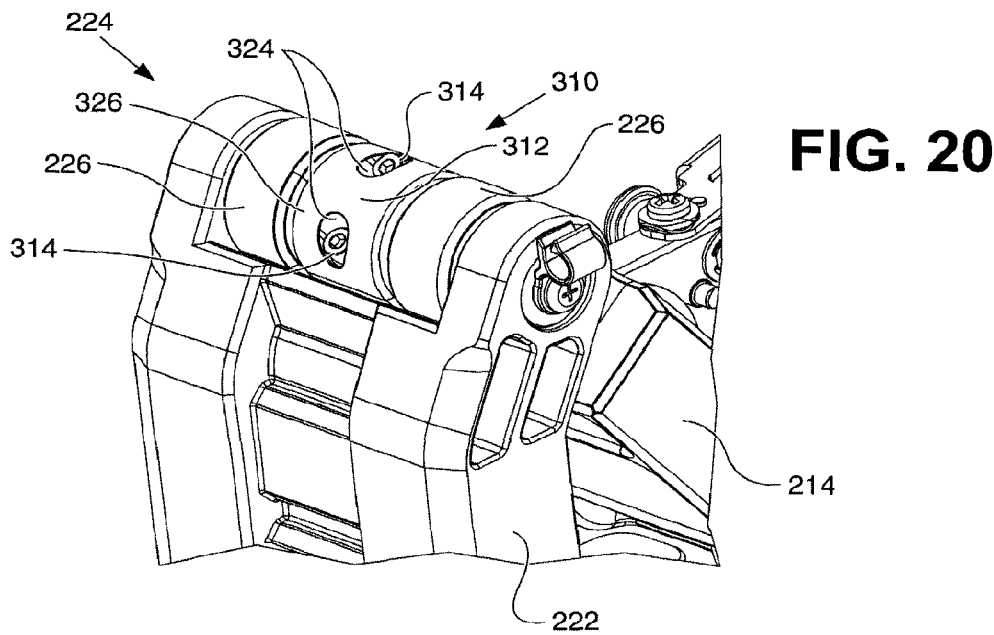
FIG. 20 is an enlarged perspective view of an embodiment of a glide movement controller.
Figure 21:
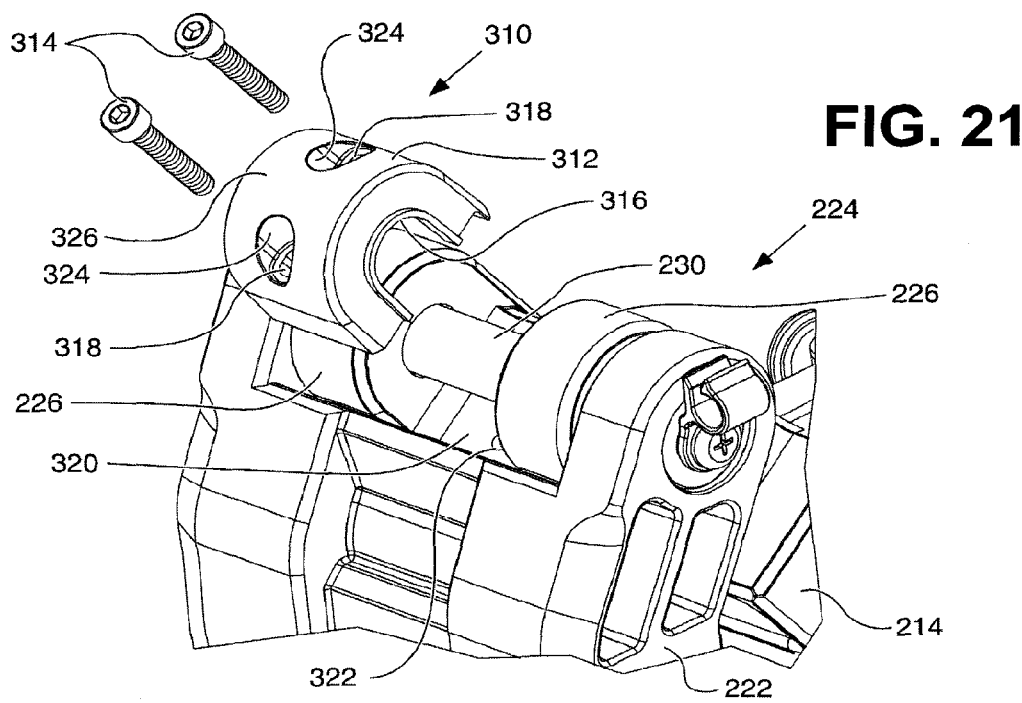
FIG. 21 is an exploded view of the glide movement controller of FIG. 20.

As can be seen in FIGS. 20-24, this embodiment of the glide movement controller 310 includes a controller body 312 and a pair of fastening members, such as screws 314. The controller body 312 is preferably generally U-shaped, when viewed from the side, as can be seen in FIG. 21. Of course other shapes are also contemplated, as long as the necessary frictional resistance to rotation of shaft 230 can be provided and the shape of the controller body does not block the relative movement of the horizontal links 214 and 222 with respect to each other.

Figure 22:
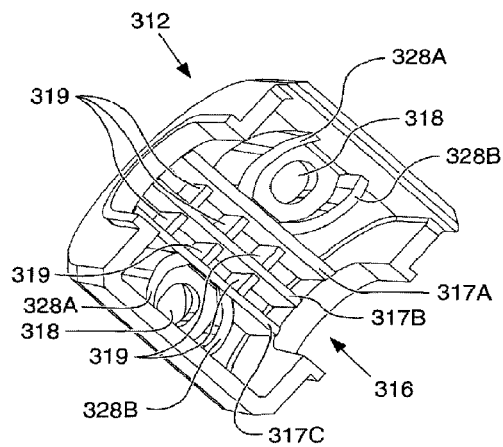
FIG. 22 is a bottom perspective view of the glide movement controller body.

As best seen in FIGS. 21 and 22, the glide controller body 312 includes an interior bearing surface 316 that is configured to make contact with shaft 230, or with a component that is fixed for rotation with the shaft. In the described embodiment, the interior bearing surface includes three ribs 317A, 317B, and 317C. Although three ribs are preferred, a greater or lesser number of ribs may also be used, depending upon the situation. Additionally, it is also contemplated that ribs may be eliminated in favor of a solid bearing surface.

As shown in FIG. 22, in order to provide additional support for ribs 317A-317C, a plurality of smaller support struts 319 may optionally be provided to extend between adjacent ribs in the direction transverse to the ribs 317A-317C. In the embodiment shown, the struts 319 are shorter than the ribs 317, and thus do not constitute part of the interior bearing surface 316.

Preferably, some form of lubricant is applied to the area of the interior bearing surface 316 to reduce wear. If the ribs 317A-317C and struts 319 are provided, the lubricant, which is preferably of a gel-like consistency, can be retained within the compartments formed by the ribs and struts.

For receiving the screws 314, the glide controller body 312 includes a pair of apertures 318 that extend through the body 312. Apertures 318 are both preferably slightly oblong to allow for a little play. Additionally, in order to provide additional strength to the areas near the apertures 318, a pair of curved interior projections 328A and 328B are preferably provided around each of the apertures 318.

Figure 24:
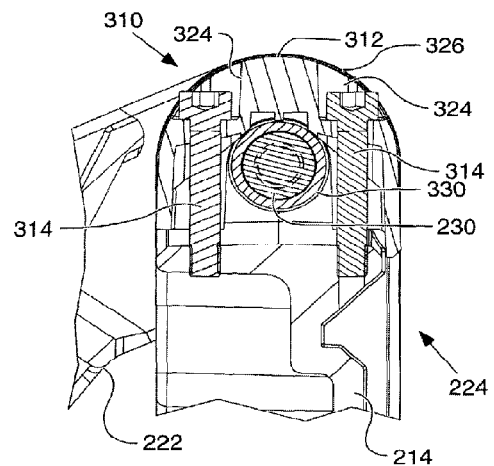
FIG. 24 is an end cross-section of the glide movement controller and hinge connection of FIG. 23.
Figure 23:
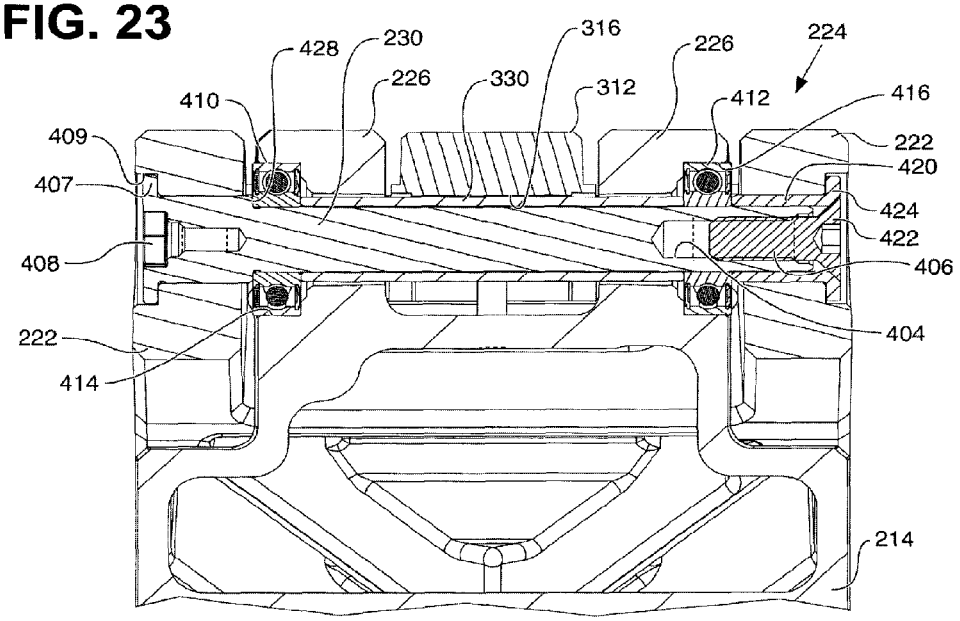
FIG. 23 is a side cross-section of the glide movement controller of FIG. 20, shows with an embodiment of a hinge connection that includes an optional spacer.

Turning now to FIGS. 23 and 24, one example of an embodiment of a hinge connection that can be used with the glide movement controller 310 will be described. Of course, other designs of hinge connections could also cooperate with the present glide movement controller. Some example of other designs of hinge connections are described in related U.S. application Ser. No. 13/194,705, which is hereby incorporated by reference it its entirety.

The embodiment of the hinge connection shown in FIGS. 23 and 24 includes an optional spacer 330 surrounding the shaft 230 (which spacer is not shown in most of the other figures). This spacer 330 is fixed for rotation with the shaft 230, so when the interior bearing surface 316 of the controller body 312 contacts the optional spacer 330, the frictional resistance applied to the spacer 330 is transferred to the shaft 230. Of course, if the optional spacer is not included, the frictional force of the interior bearing surface 316 of the controller body 312 is applied directly to the shaft 230.

In this embodiment of the hinge connection, one end of the shaft 230 includes a threaded aperture 404 for receiving a threaded member such as screw 406, while the other end includes a hex socket 408 for receiving a hex wrench to apply a rotary force to (or to prevent rotation of) the shaft 230 during tightening of the screw 406. As known in the art, the hex socket 408 could be replaced with any known configuration for receiving a tool for preventing rotation or for applying a rotary force to the shaft. This end of the shaft 230 also preferably includes a first shoulder portion 407 that is configured to bear against the transverse surface of enlarged bore 409, and a second shoulder portion 428 that is configured to bear against bearing 410.

The shaft 230 is rotatably held within two sets of bearings 410 and 412, which are seated within recesses 414, 416, respectively, in inner flanges 226. Bearings 410 and 412 may be of any desired type, such as ball bearings, needle bearings, roller bearings, journal bearings, etc. The optional spacer 330, if provided, surrounds the shaft 230 in a location between the bearing 410 and the bearing 412. Finally, a bushing 420 is provided to surround the axial end of the shaft 230 in the area between the bearing 412 and head 422 of the screw 406. As can be seen in FIG. 23, the bushing 420 preferably includes a bushing flange 424 for receiving the axial force from the screw head 422 as the screw 406 is tightened. Upon tightening of the screw 406, the spacer 330 (if provided) will be fixed for rotation with the shaft 230, as mentioned above.

Returning to FIG. 21, a wall 320 can be seen on horizontal link 214 between inner flanges 226. The wall 320 includes a pair of threaded apertures 322 (only one of which is visible in FIG. 21). To attach the glide controller body 312 to the hinge 224, one screw 314 is inserted into each aperture 318, and then into each threaded aperture 322 within wall 320. Tightening of the screws 314 causes the interior bearing surface 316 of the body 312 to more tightly contact the shaft 230, thereby applying resistance to the relative movement of the links 214, 222 of the hinge 224, resulting in resistance to the gliding movement of the entire linear glide mechanism. Of course, loosening of the screws 314 diminishes the amount of resistance.

In the embodiment of the glide movement controller 310 shown in FIGS. 20-24, the apertures 318 in controller body 312 each preferably include a counterbore 324 (FIGS. 20 and 21) so that the heads of the screws 314 can be seated below the outer peripheral surface 326 of the controller body 312. Such a configuration eliminates possible interference between the screw heads and the adjacent surfaces of link 222, which interference could otherwise prevent the full movement of links 214 and 222 with respect to each other. As can be seen in FIGS. 20 and 21, the shape of the outer peripheral surface 326 of controller body 312 matches the shape of the corresponding surfaces of the adjacent inner flanges 226, thereby eliminating the possibility of interference with adjacent surfaces of link 222, as well as providing a smooth appearance for the glide movement controller 310.

The glide movement controller 310 has been described in connection with a miter saw. However, it is contemplated that such a controller could be used with other devices, such as other power tools, and especially with other devices that include linear guide mechanisms of the types described herein.

While various embodiments of the invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A hinge connection between a first link and a second link, said hinge connection comprising:
   a shaft that is fixed for rotation with respect to said first link;
   a first bearing and a second bearing associated with said second link, wherein said shaft is seated within said first and second bearings; and
   a glide movement controller operatively connected to the hinge connection, wherein said glide movement controller comprises a controller body that is configured and arranged to be moved such that resistance upon said shaft is increased upon movement in a first direction and decreased upon movement in a second direction,
   wherein said controller body includes an interior bearing surface that is configured and arranged to face said shaft, such that said interior bearing surface provides the resistance for inhibiting, but not preventing, rotation of said shaft, thereby inhibiting, but not preventing, relative movement between said first and second links.

2. The hinge connection according to claim 1, further comprising:
   a pair of apertures extending through said controller body, wherein at least a portion of said interior bearing surface is located between said apertures;
   a pair of threaded apertures formed in a wall of said second link, whereby said threaded apertures of said second link are aligned with said apertures of said controller body; and
   a pair of threaded fasteners, whereby each of said threaded fasteners is configured and arranged to extend through one of said apertures of said controller body and to be secured into one of said threaded apertures of said second link,
   wherein said controller body is positioned between said first bearing and said second bearing.

3. The hinge connection according to claim 2, wherein:
   said controller body is generally U-shaped; and
   said interior bearing surface includes a plurality of ribs extending in a direction parallel to the shaft.

4. The hinge connection according to claim 3, further comprising:
   a plurality of struts formed between adjacent pairs of said ribs, wherein said struts extend transverse to said ribs;
   a plurality of compartments defined between adjacent pairs of said ribs and adjacent pairs of said struts; and
   a pair of curved interior projections formed around each of said apertures of said controller body.

5. The hinge connection according to claim 1, wherein said interior bearing surface is configured and arranged to increase the resistance by more tightly directly contacting said shaft and to decrease the resistance by less tightly directly contacting said shaft.

6. The hinge connection according to claim 1, wherein:
   said hinge connection includes a spacer surrounding said shaft, whereby said spacer is fixed for rotation with respect to said shaft; and
   said interior bearing surface is configured and arranged to increase the resistance by more tightly contacting said spacer and to decrease the resistance by less tightly contacting said spacer.

* * * * *